(12) United States Patent (10) Patent No.: US 7,997,130 B1
Stonner et al. (45) Date of Patent: Aug. 16, 2011

(54) SYSTEM AND METHOD FOR MEASURING DEFORMATION OF AN OBJECT IN A FLUID TUNNEL

(75) Inventors: Donna E. Stonner, St. Louis, MO (US); Ronald L. Goodman, O'Fallon, MO (US); Michael E. Benne, St. Paul, MO (US)

(73) Assignee: The Boeing Company, Chicago, IL (US)

( * ) Notice: Subject to any disclaimer, the term of this patent is extended or adjusted under 35 U.S.C. 154(b) by 280 days.

(21) Appl. No.: 12/412,955

(22) Filed: Mar. 27, 2009

(51) Int. Cl.
*G01M 9/00* (2006.01)
(52) U.S. Cl. .......................................................... 73/147
(58) Field of Classification Search ........................ None
See application file for complete search history.

(56) References Cited

U.S. PATENT DOCUMENTS

| | | | | |
|---|---|---|---|---|
| 4,377,343 | A | * | 3/1983 | Monson ........................ 356/503 |
| 5,020,364 | A | * | 6/1991 | Manitt et al. .................... 73/147 |
| 5,345,818 | A | * | 9/1994 | Magill et al. ................... 73/147 |
| 7,254,998 | B2 | | 8/2007 | Rueger |

OTHER PUBLICATIONS

Charles V. Spain, "Assessing Videogrammetry for Static Aeroelastic Testing of a Wind-Tunnel Model," 45th AIAA/ASME/ASCE/AHS/ASC Structures, Structural Dynamics and Materials Conference, Palm Springs, California, Apr. 19-22, 2004.
Wim Ruyten, "Model Attitude Measurement with an Eight-Camera Pressure-Sensitive Paint System," 38th Aerospace Sciences Meeting and Exhibit, Reno, NV, Jan. 10 -13, 2000.

* cited by examiner

*Primary Examiner* — Lisa Caputo
*Assistant Examiner* — Jermaine Jenkins
(74) *Attorney, Agent, or Firm* — Novatech IP Law; Sean Casey

(57) ABSTRACT

A monitoring system for monitoring a test article includes a scanning system and a computer system. The test article may be positioned within a fluid tunnel. The scanning system may be configured to scan the test article and record positional data of at least one point on an article surface of the test article. The computer system is in communication with the scanning system for receiving the positional data and being operative to determine at least one of the following: a position of the test article, an attitude of the test article, and deformation of the article surface.

25 Claims, 13 Drawing Sheets

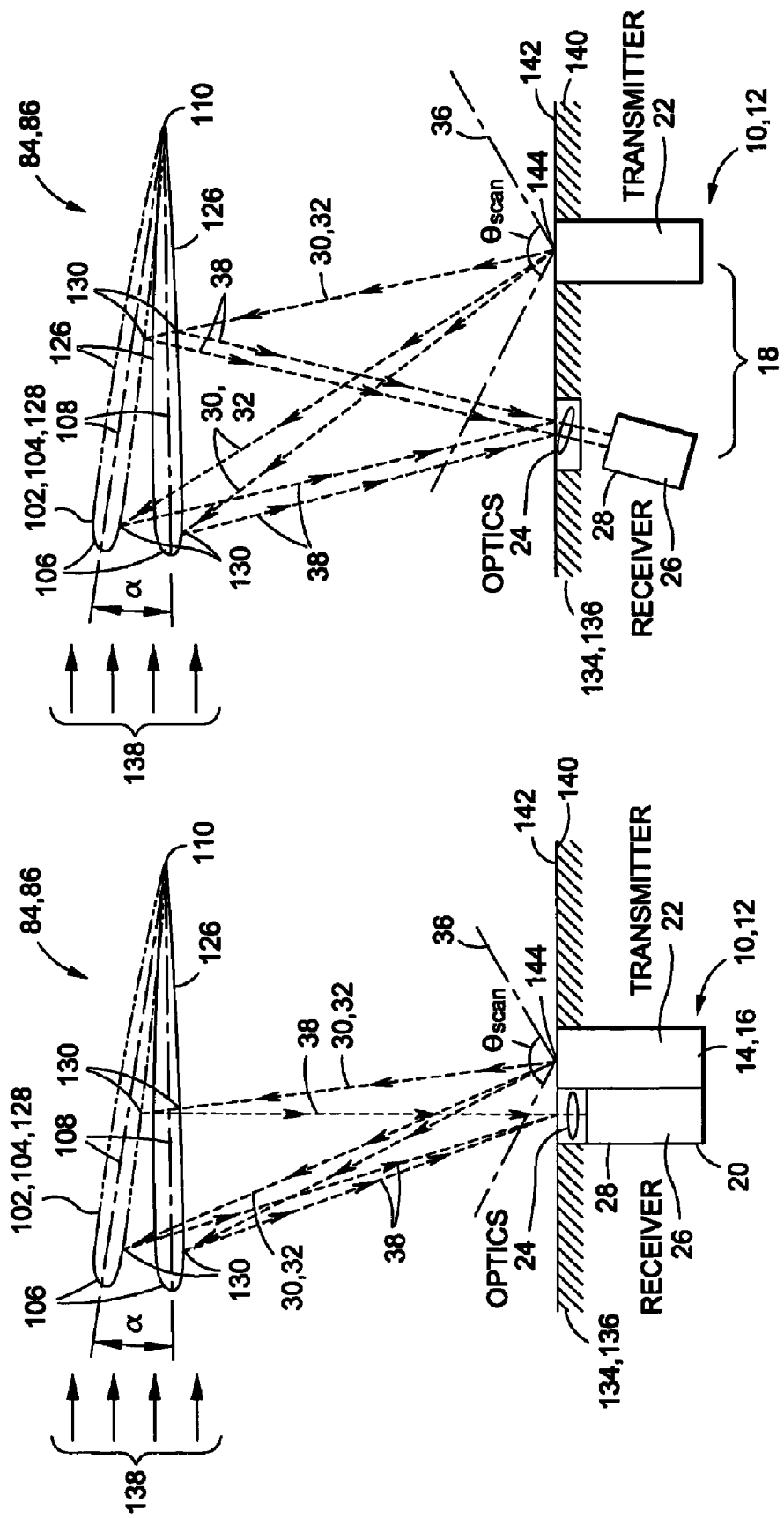

SYSTEM AND METHOD FOR MEASURING DEFORMATION OF AN OBJECT IN A FLUID TUNNEL

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to measurement systems and, more particularly, to a system for monitoring position, attitude and/or deformation of an object in a fluid tunnel.

BACKGROUND

Fluid tunnels are used in a variety of applications to measure the effects of fluid flow over an object. For example, in aerodynamic testing, wind tunnels are used to measure the response of a test article such as a scale model aircraft to air passing over the aircraft. The wind tunnel provides a means to evaluate the test article in a controlled environment under conditions that are dynamically similar to conditions to which a full-size version of the aircraft may be subjected in actual flight. Air in the wind tunnel flows over the scale model aircraft at a controlled speed in order to evaluate the aerodynamic response of the scale model aircraft at different positions and attitudes. The attitude of the scale model aircraft may be defined in terms of roll, pitch, and yaw about the respective longitudinal, lateral, and vertical axes of the aircraft.

Scale model aircraft in a wind tunnel may be supported by a variety of different means including, but not limited to, a sting and balance mechanism extending out of an aft end of the aircraft. The sting forms part of a support mechanism for the aircraft and provides the ability to statically position or dynamically move the aircraft. For example, in changing the pitch angle of the aircraft, the sting may rotate the aircraft from a current attitude (e.g., a zero-pitch attitude or horizontal attitude) to a positive pitch attitude wherein the forward end of the aircraft is pointing upwardly relative to horizontal. In the positive pitch attitude, the wings of the aircraft may be oriented at a positive angle of attack relative to the direction of fluid flow through the wind tunnel. The direction of fluid flow may be assumed to be generally parallel to the tunnel walls or to the tunnel centerline which may also be assumed to be horizontal.

The support mechanism or sting may be commanded to change the roll attitude of the aircraft (i.e., rotation about a longitudinal axis of the aircraft) or yaw attitude (i.e., rotation about a vertical axis). The above-noted changes in roll, pitch and yaw as well as positional changes (i.e., horizontal or vertical movement) may be performed in order to measure air loads on the aircraft at different attitudes and positions. Three main forces that act on the aircraft include lift, drag and side force. As is known in the art, lift is a force that is directed vertically upwardly, drag force acts in an axially aft direction, and side force acts in a sideways or lateral direction. Other loads induced on the aircraft as a result of fluid flow include rolling moment, pitching moment and yawing moment which act as a torque on the aircraft about the respective longitudinal, lateral and vertical axes of the aircraft.

Measurement of the above-noted forces may be facilitated using strain gauges or other instrumentation mounted on the balance which may be integrated into the aft-mounted sting that supports the aircraft. The strain gauges measure the magnitude of forces such as lift and drag that act on the aircraft at different attitudes and positions. Accurate determination of the magnitude of the force on a scale model aircraft is necessary in order to develop and improve the design configuration of a full size aircraft. As is known, minor reductions in aerodynamic drag acting on an aircraft such as a commercial airliner can result in a significant reduction in fuel consumption when measured over long distances.

Included in the prior art are several methods for measuring the attitude of an object such as an aircraft in a wind tunnel. For example, mechanical instrumentation such as potentiometers mounted on the support mechanism measure attitude (e.g., pitch and roll) of the aircraft. Potentiometers or other attitude-measuring instrumentation may be used in conjunction with force-measuring instrumentation such as strain gauges. Although potentiometers are generally suitable for indicating the attitude of the aircraft, they possess certain limitations which may reduce accuracy with which attitude is measured.

For example, with the tunnel in a wind-on mode wherein fluid is flowing over the aircraft, air loads acting on the aircraft can deflect the sting which supports the aircraft. Because of their mounting arrangement, potentiometers may be incapable of measuring sting deflection which may compromise the accuracy of aircraft attitude measurements. For example, if the support mechanism is commanded to rotate the aircraft from horizontal to a 2.5 degree positive pitch angle, deflection or bending in the sting as a result of air loads on the aircraft can result in an actual attitude of less than 2.5 degrees despite an indicated 2.5 degree pitch angle reading from the potentiometer. As a result, drag force measured by the strain gauges may be incorrectly correlated to the indicated 2.5 degree pitch angle. Accuracy of attitude measurements may further be compromised as a result of mechanical movement or hysteresis in structure connecting the support mechanism to the sting or the sting to the aircraft.

Another prior art method for measuring attitude of an object in a wind tunnel includes the use of photogrammetry or videogrammetry wherein a system of cameras are mounted in spaced locations in the wind tunnel. The cameras are directed at targets applied to the surfaces of the test article such as a scale model aircraft. The cameras record images of the targets to measure the effects of fluid flow over the surfaces. By combining positional data regarding the known locations of the cameras relative to the test article, known locations of the aircraft relative to the wind tunnel, and known locations of the targets relative to the aircraft, the actual attitude of the aircraft can be accurately determined using the collection of recorded images taken by the system of cameras.

Unfortunately, the use of photogrammetry or videogrammetry as described above is computationally intensive due to the large number of cameras (e.g., eight cameras) required and the need to calibrate the positions of the cameras relative to the wind tunnel. Furthermore, photogrammetric and videogrammetric applications lack the ability for real-time visualization of the test article during wind tunnel operation. Real-time visualization of the aircraft is desirable in order to verify that the attitude measurement system is functioning properly during testing and that measurement data is being accurately recorded in order to avoid the time and expense of repeat testing. Likewise, real-time visualization of the attitude, position and deformation of the test article or support mechanism (i.e., sting) is desirable so that alterations in the test program can be made during testing.

As can be seen, there exists a need in the art for a system for monitoring a test article in a wind tunnel which allows for highly accurate measurement of the actual attitude and position of the test article during testing. Additionally, there exists a need in the art for a system for accurately controlling the attitude and position of the test article during testing. Finally, there exists a need in the art for a system for real-time visualization of the test article during test in order to observe the response of the test article and verify that attitude measurement and data acquisition systems are functioning properly.

BRIEF SUMMARY

The above-noted needs associated with monitoring systems for test articles in fluid tunnels are specifically addressed and alleviated by the present disclosure which provides a monitoring system for monitoring a test article having at least one article surface and which is positionable in a fluid tunnel. In a broad sense, the monitoring system comprises a scanning system and a computer system. The scanning system is specifically adapted to scan the test article and record positional data of a plurality of points on the article surface(s). The computer system is communicatively coupled to the scanning system and is adapted to receive the positional data from the scanning system and determine a position and attitude of the test article and/or any deformation that may be occurring on one or more article surfaces of the test article.

In one embodiment, the scanning system comprises one or more optical sensors such as laser scanners which may be mounted to the tunnel walls of the fluid tunnel in a manner that avoids disrupting the aerodynamics of the fluid tunnel. For example, the optical sensor (e.g., laser scanners) may be mounted such that the bulk of the optical sensors are positioned on an external side of the tunnel walls. The optical sensor may be configured in a variety of different configurations including, without limitation, any non-contacting scanner or optical measurement system which relies on optics to measure the topography of one or more surfaces of the test article.

In an embodiment, the optical sensors may be provided as laser scanners. The laser scanners may be configured as triangulation scanners and/or as time-of-flight scanners, each of which operates under well known principles for scanning the article surfaces of the test article. Such laser scanners collect three-dimensional positional data of a plurality of points (e.g., up to 100,000 or more) to form a point cloud representative of one or more article surfaces on the test article. The point cloud may be reconstructed to form a digital model that may be useful for determining, without limitation, the attitude, position and/or deformation of the test article. The positional data and/or the digital model may also be used for controlling movement of the test article such as for reorienting the test article from a current attitude or position to a desired or subsequent attitude or position. Furthermore, the positional data measured and recorded by the scanning system may be adapted for generating a real-time graphic visualization of the test article under test in the wind tunnel.

It should also be noted that the monitoring system as disclosed herein is not limited for use in fluid tunnels. In this regard, the monitoring system may be adapted for use in any environment, application, system, assembly, operation or process in which accurate attitude, position and/or deformation measurements are desired. The measured and/or recorded attitude, position and/or deformation data may also be used for controlling the movement of any type of object including movement of a test article in a fluid tunnel. The monitoring system may further include the capability for real-time, near real-time, or post-test visualization of the object.

The technical effects of the disclosed embodiments include an improvement in the accuracy by which the attitude and/or position of the test article may be determined such that measurement of forces and moments acting on the test article may be accurately correlated to the actual attitude and/or position of the test article. In this regard, the monitoring system as disclosed herein reduces uncertainties in measurements of the attitude and/or position of the test article in order to yield highly accurate information response to aerodynamic loading or other types of loading. Advantageously, the monitoring system reduces the amount of time required to configure the test article and the fluid tunnel for testing due to the non-contact nature of the monitoring system.

In this regard, the monitoring system is less intrusive than prior art methods for measuring the attitude and position of test articles while providing improved reliability. Furthermore, the monitoring system as disclosed herein reduces the amount of time and cost required for calibrating the attitude measurement instrumentation with the force and moment instrumentation as compared to conventional monitoring systems. A further advantage provided by the monitoring system is the capability for recording and storing the positional data for post-run analyses of model attitude, position, deformation and other data acquired during testing.

In an embodiment, the scanning system may comprise a plurality of laser scanners which may be mounted in spaced relation to one another on the fluid tunnel. For example, the fluid tunnel may comprise a rectangularly shape set of orthogonally-arranged tunnel walls. Each one of the tunnel walls may include at least one laser scanner which may be positioned along a length of the tunnel wall such that the test article is within the field of view of the laser scanner. Each one of the laser scanners may be configured to record positional data regarding a plurality of points on the article surfaces of the test article as earlier mentioned.

The test article may be supported by a support mechanism which supports the test article relative to the fluid tunnel. For example, the test article may be supported by a sting/balance arrangement extending from an aft end of the test article in a manner known in the art. However, the support mechanism may comprise a variety of different arrangements for supporting the test article. For example, the support mechanism may comprise one or more struts, cables, and other structural-mechanical arrangements for supporting the test article relative to the fluid tunnel and/or for providing the capability for controlling the attitude and/or position of the test article.

The computer system may include support control logic for regulating movement of the test article from a current attitude to a desired attitude and/or from a current position to a desired position. The support control may receive data representative of the current attitude and/or position of the test article. Such data may include the positional data measured and recorded by the scanning system in the form of positional data of the article surfaces. Data may be provided in Cartesian, spherical and/or other suitable coordinate systems in the point cloud of positional data. In an embodiment, the point cloud data may be reconstructed into the digital model representative of the scanned test article for processing by a processor and subsequent use in the support control logic. However, it is also contemplated that the point cloud data may be used directly in the support control logic without prior reconstruction into the digital model.

The test article may be moved in a number of different orientations including, but not limited to, roll, pitch and yaw as conventionally used in describing the orientation and movement of aircraft and other vehicles. For example, the scale model aircraft may define a pitch angle relative to horizontal. The current attitude and the desired attitude may comprise the current pitch angle and the desired pitch angle of the aircraft, respectively. The computer system may be operative to generate a point cloud based upon positional data gathered by the laser scanners in order to reconstruct the point cloud and generate the digital model of the aircraft. The digital model may be displayed in any suitable two-dimensional or three-dimensional form including, but not limited to, a wireframe model and/or a surface model of the test article. The monitoring system may further include a display device such as a personal computer (PC), a laptop, a Palm Pilot or any other suitable display device which may be placed in communication with the computer system and which may be operative to display the digital model in graphical and/or tabular form. The computer system may be configured to simultaneously regulate movement of the test article while displaying the digital model of the test article on the display device.

Advantageously, the scanning system is further adapted to monitor the attitude, position and/or deformation of the support mechanism such as the sting extending from the aft end of the aircraft. The scanning system may be configured to scan the support mechanism while simultaneously scanning the test article. The computer system may be operative to detect any deflection such as bending that may occur in the test article and/or support system as may be the result of aerodynamic loading induced in the test article and which may be transmitted to the sting and which may cause the sting to deflect. Likewise, the scanning system may be configured to scan the tunnel walls while scanning the test article and support mechanism in order to detect and measure displacement of the tunnel walls as may occur in response to fluid flowing through the fluid tunnel or as a result of vibration due to machinery. Such displacement in the tunnel walls may have an effect on the accuracy of the positional data of the test article. In this regard, the displacement of the tunnel walls and deflection of the support mechanism may be incorporated into the support control logic in combination with other tunnel parameters in order to accurately control the attitude and position of the test article.

The monitoring system may further be adapted to generate images of the test article such as the digital model mentioned above for display on the display device. The digital model may be displayed in any number of forms including as a wireframe model and/or as a surface model. The computer system may be operative to display superimposed digital models of the test article at the same attitude but at different wind tunnel modes of operation. More specifically, when fluid (e.g., air) in the wind tunnel is essentially static (i.e., non-moving) relative to the test article, the fluid tunnel may be said to be in a wind-off mode. When fluid is flowing past the test article, the fluid tunnel may be said to be in a wind-on mode. The computer may be operative to compare the digital models of the test article in the wind-off and the wind-on modes for a given attitude and/or position in order to determine the existence of deformation in one or more of the article surfaces. The computer system may be operative to correlate other test data such as tunnel environmental data to the positional data gathered and to correlate such data to forces and moments acting on the test article during testing.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present invention will become more apparent upon reference to the drawings wherein like numbers refer to like parts throughout and wherein:

FIG. 7 is a side view of one of the laser scanners configured as a time-of-flight scanner mounted to a tunnel wall of the fluid tunnel;

FIG. 8 is a side view of one of the laser scanners configured as a triangulation scanner mounted to the tunnel wall of the fluid tunnel;

DETAILED DESCRIPTION

Figure 1:
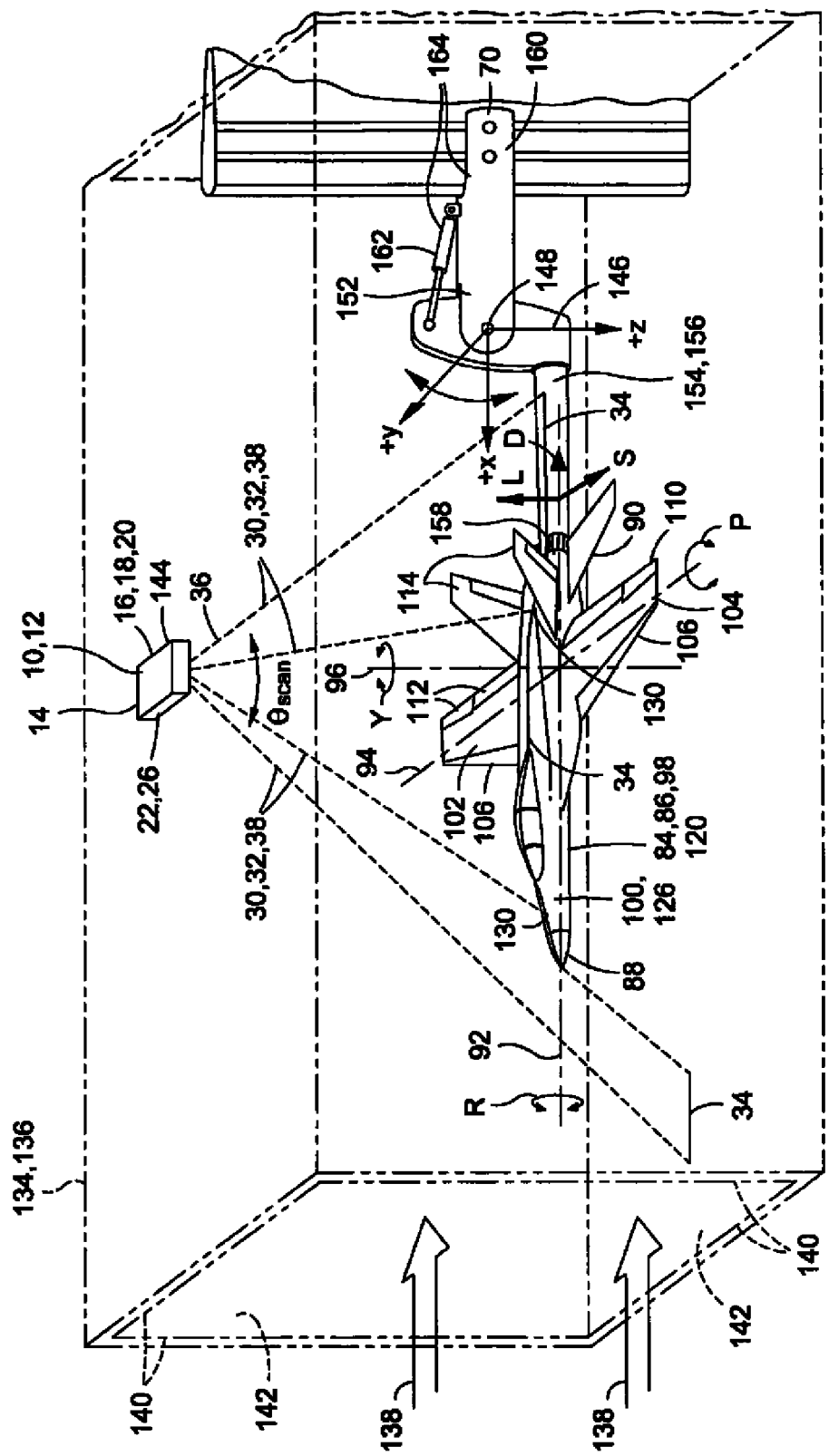
FIG. 1 is a perspective illustration of a monitoring system comprising, in an embodiment, a computer system and a scanning system incorporated into a fluid tunnel having a test article mounted via a support mechanism.

Referring now to the drawings wherein the showings are for purposes of illustrating preferred and various embodiments of the disclosure only and not for purposes of limiting the same, shown in FIG. 1 is a monitoring system 10 as may be used for monitoring an object such as a test article 84 in a fluid tunnel 134 such as a wind tunnel 136. In a broad sense, the monitoring system 10 may comprise a scanning system 12 and a computer system 66 in communication with the scanning system 12. The scanning system 12 may comprise any suitable optical sensor 14 including, but not limited to, a laser scanner 16 for scanning surfaces of objects or test articles 84 and measuring and recording positional data of a plurality of points on the test article 84 surfaces. The computer system 66 receives the positional data regarding the plurality of points (i.e., the shape of the object) and is operative to determine parameters of the test article 84 including, without limitation, the attitude, position and/or deformation of the test article 84 such as during wind tunnel 136 operation.

Although described below in conjunction with a scale model 86 of an aircraft 98 mounted within a wind tunnel 136, the monitoring system 10 as disclosed herein may be used for monitoring a variety of objects. In this regard, the monitoring system 10 as disclosed herein may be used for monitoring position, attitude and/or deformation and other parameters of any object of any type, shape, size or configuration and for use in any industry, application, system or environment. In an embodiment, the monitoring system 10 as described below may be used in conjunction with the testing of scale models 86. Such scale models 86 may comprise, without limitation, buildings, structures, assemblies, vehicles such as automobiles and trucks, projectiles such as missiles and launch vehicles, and air vehicles such as fixed wing aircraft and rotor wing aircraft.

The monitoring system 10 may further be applied for use with other types of fluid tunnels 134 including water tunnels as may be used for testing marine vehicles such as submarines and ships and for testing land, air and space vehicles. The fluid tunnel 134 may also be adapted for testing full-size objects such as a full-size aircraft 98. In this regard, the monitoring system 10 as disclosed herein may be used for testing any type of structure, whether stationary or movable and including, but not limited to, buildings such as high-rise office buildings, assemblies such as windmills, and may further include live objects such as human athletes.

Figure 2:
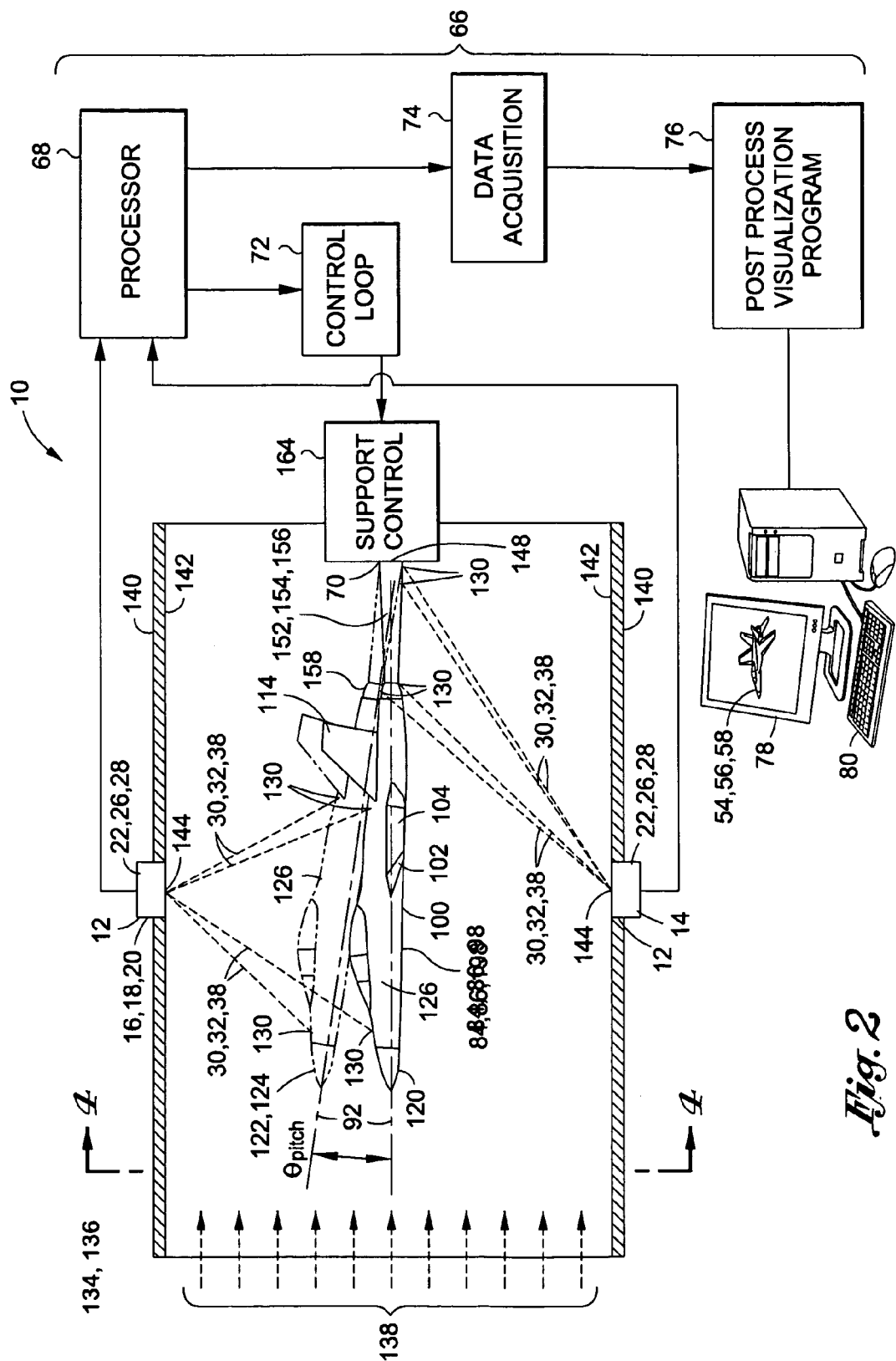
FIG. 2 is a side illustration of the fluid tunnel and the test article of FIG. 1 and further illustrating the test article at a current attitude and at a desired attitude.

Referring to FIGS. 1 and 2, shown is the fluid tunnel 134 configured as a wind tunnel 136 as conventionally known and which is adapted for directing a flow of fluid (e.g., air) therethrough in a manner that simulates the actual environment to which a real-world (i.e., full-size) version of the scale model 86 may be subjected. For example, the wind tunnel 136 may be used for determining the drag characteristics of a scale model 86 aircraft 98 oriented at different attitudes to predict the response of a full scale version to actual flight conditions. The wind tunnel 136 may be used for evaluating the physical response (i.e., displacement, twist, deformation) of the aircraft 98. Advantageously, the monitoring system 10 as disclosed herein may also be adapted for determining the position, attitude and/or deformation while simultaneously displaying a digital model 54 of the test article 84 in real-time. The monitoring system 10 may further be adapted to include the positional data of the article surfaces 126 into a control loop 72 for use in adjusting the position and/or attitude of the test article 84. More specifically, the actual attitude and/or position of the test article 84 may be measured by the scanning system 12 such that the attitude of the test article 84 may adjusted in response to a commanded attitude such as from an operator or from a preprogrammed set of instructions.

The fluid tunnel 134 may be operated in a wind-off mode corresponding to an absence of fluid flow 138 relative to the test article 84. The fluid tunnel 134 may also be operated in a wind-on mode corresponding to the presence of fluid flow 138 relative to the test article 84. By operating the monitoring system 10 in the wind-off or wind-on mode, response of the test article 84 to aerodynamic loads induced thereon may be accurately correlated to the attitude of the test article 84. Furthermore, deformation in the article surfaces 126 as a result of aerodynamic loads may be accurately correlated to the attitude of the test article 84. In addition, the use of multiple laser scanners 16 positioned in spaced relation to one another in the fluid tunnel 134 provides a means to detect relative motion or displacement of the tunnel walls 140 and/or of the laser scanners 16 that may be mounted to the tunnel walls 140. Displacement of the tunnel walls 140 may be measured when scanning the test article 84 in order to compensate for any such displacement in the measurements of the test article 84. Although the laser scanners 16 may be fixedly mounted to the tunnel walls 140, it is contemplated that the laser scanners 16 may be (???) independently mounted to prevent the transmission of displacement of the tunnel walls 140 to the laser scanners 16.

Figure 4:
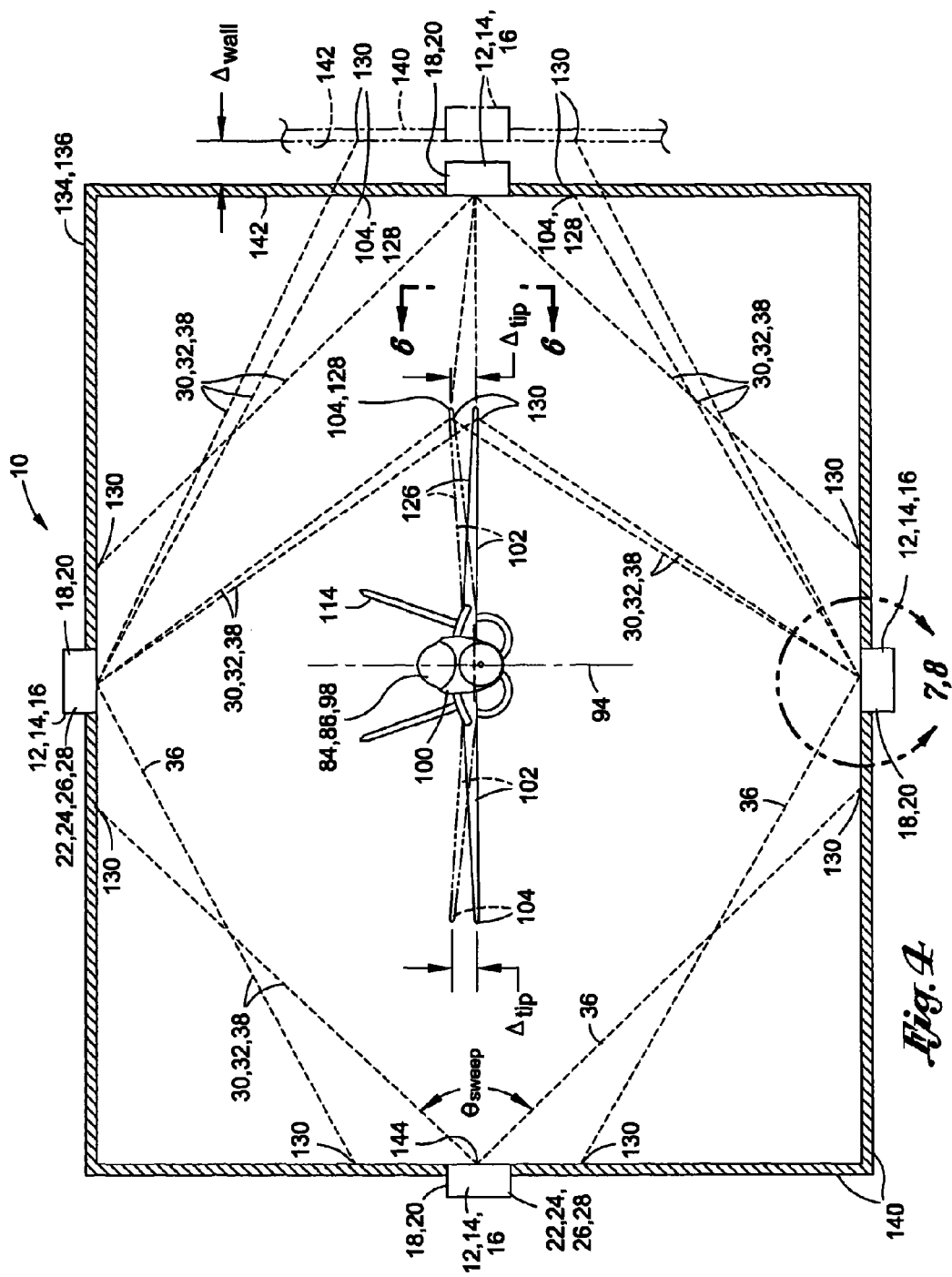
FIG. 4 is a section view of the fluid tunnel taken along line 4-4 of FIG. 2 and illustrating the scanning system comprised of, in one embodiment, a plurality of laser scanners.

Although only a single laser scanner 16 is shown mounted on an upper tunnel wall 140 of the fluid tunnel 134, any number may be used and may be positioned at any location. For example, as shown in FIG. 4, the scanning system 12 may comprise a laser scanner 16 mounted to each one of the tunnel walls 140. Furthermore, each laser scanner 16 may be positioned relative to the test article 84 to optimize the ability to scan the entire test article 84 or a portion thereof. Parameters of the laser scanner 16 such as resolution, field of view, and distance from the laser scanner 16 to the test article 84 may be considered in selecting the laser scanner 116 configuration. Each laser scanner 16 may have a field of view that may be defined by a sweep angle $\theta_{sweep}$ of transmitted light 30 emitted by the laser scanner 16 as shown in FIG. 4. The field of view of the laser scanner 16 may encompass at least a portion of one of the tunnel walls 140 such that wall displacement $\Delta_{wall}$ may be detected, measured and compensated for when scanning the test article 84.

In an embodiment, the scanning system 12 may comprise a single laser scanner 16 mounted along a centerline of one of the tunnel walls 140 such as along an upper tunnel wall 140 as shown in FIG. 1 wherein the laser scanner 16 may be generally centered relative to the test article 84. In a further embodiment, the scanning system 12 may comprise a plurality of strategically-positioned laser scanners 16 which may be activated on an as-needed basis depending upon the size of the test article 84, the type of test to be conducted, range of movement of the test article 84 and support mechanism 152 configuration, among other considerations. The laser scanners 16 are preferably positioned to facilitate the scanning of a wide range of sizes, shapes and configurations of test articles 84. Advantageously, the laser scanners 16 can be activated on an as-needed basis without the need to reconfigure the wind tunnel 136 for each new test article 84 configuration and/or for different testing conditions.

The laser scanners 16 are preferably mounted to be generally flush with an interior wall surface 142 of the tunnel walls 140 in order to minimize disturbance of the aerodynamics of the wind tunnel 136. In this regard, each one of the tunnel walls 140 may include a port 144 to which the laser scanner 16 may be installed. Mounting is preferably in a manner that obviates the need for a window panel or other medium which may reduce measurement accuracy by altering the optics of the transmitted and reflected light 38 passing through the medium.

It should be noted that the scanning system 12 is not limited to laser scanners 16 but may include any suitable optical sensor 14 capable of accurate, non-contact measurement of the topography of article surfaces 126 of the test article 84. In this regard, any optical sensor 14 that is capable of emitting light and detecting a reflection of such light may be used. For example, the optical sensor 14 may comprise an ultrasonic sensor or an X-ray sensor. Furthermore, the optical sensor 14 may be adapted to detect reflected ambient light without the need for projecting or transmitting a source of light from the optical sensor 14.

The test article 84 may be mounted within the fluid tunnel 134 on a support mechanism 152 as shown in FIG. 1 or in any suitable manner. For example, the test article 84 may be mounted using a sting 154 as conventionally known. The sting 154 may include a balance 158 incorporating suitable instrumentation such as strain gauges, potentiometers, transducers and other devices for measuring forces such as lift L, drag D, and side force S and various moments acting on the test article 84. The sting 154 may be attached to the test article 84 at the aft end 90 thereof. An opposite end of the sting 154 may be coupled to the support mechanism 152. The support mechanism 152 may include a rotation mechanism 162 for altering the angular orientation of the test article 84 relative to the wind tunnel 136. The support mechanism 152 may further include a translation mechanism 160 for altering the vertical and/or horizontal location of the test article 84 relative to the wind tunnel 136.

Rotation of the rotation mechanism 162 may effectuate changes in attitude of the test article 84. For example, the pitch angle $\theta_{pitch}$ of the test article 84 may be changed by means of a jack screw with an electric motor or by using a hydraulic piston as shown in FIG. 1 or in any other suitable manner. The rotation mechanism 162 is operative to move the test article 84 from a current attitude 120 to a desired attitude 122 as shown in FIG. 2. Movement of the test article 84 may be commanded by an operator of the wind tunnel 136, autonomously according to a preprogrammed test sequence or in any other suitable manner. Although the support mechanism 152 is illustrated as comprising a sting 154/balance 158 arrangement for supporting the test article 84, other configurations of the support mechanism 152 are contemplated. For example, the support mechanism 152 may comprise a system of struts extending from the tunnel walls 140 to the test article 84. Cables may also be used or a combination of struts, cables, and other suitable support mechanism 152 configurations are contemplated.

Referring to FIGS. 1-6, the various features and functions of the test article 84 are shown and described herein with reference to the scale model 86 aircraft 98 although the test article 84 may comprise any object of any size, shape and configuration as mentioned above. The scale model 86 aircraft 98 as shown may include a fuselage 100 having a forward end 88 and an aft end 90 and having a pair of wings 102 and a tail section 114. In an embodiment, the scanning system 12 may be specifically configured to measure positional data of specific areas of interest 128 of the test article 84 such as the wing tips 104 of each one of the wings 102 in order to detect wing tip 104 displacement $\Delta_{tip}$ and/or wing twist $\theta_{twist}$ in response to fluid flowing over the wing 102. In this regard, the scanning system 12 may also be adapted to measure and record positional data of predetermined areas of interest 128 of the test article 84 such as control surfaces 112 including, without limitation, ailerons and flaps on the wing 102 leading edges 106 and/or trailing edges 110, on the tail section 114 and on any other specific areas of interest 128.

The aircraft 98 is supported in the wind tunnel 136 by the support mechanism 152 which may be operative to move the test article 84 to a variety of attitudes and positions. The change in attitude may include a change in pitch angle $\theta_{pitch}$ comprising rotation of the test article 84 about an axis that is parallel to the lateral axis 94 as shown in FIG. 1. The change in pitch angle $\theta_{pitch}$ may result in the imposition of bending forces on the wing 102 which may cause wing tip 104 displacement $\Delta_{tip}$ and/or wing twist $\theta_{twist}$ as well as changes in lift L and/or drag D. Movement of the test article 84 in a yawing direction about an axis that is generally parallel to the vertical axis 96 as illustrated in FIG. 1 may induce side forces S on the aircraft 98 and an increase in drag D. Movement of the test article 84 about an axis that is oriented generally parallel to the longitudinal axis 92 results in a change in roll angle of the aircraft 98 and may induce different loads on the aircraft 98. Changes in the attitude and/or position of the aircraft 98 may also result in changes in rolling moment R, pitching moment P and/or yawing moment Y about the longitudinal axis 92, lateral axis 94 and vertical axis 96, respectively, as illustrated in FIG. 1.

The monitoring system 10 may be used in conjunction with the force-measuring instrumentation (e.g., strain gauges) which may be mounted in the balance 158 at the aft end 90 of the aircraft 98 test article 84. Correlating the magnitude of the measured forces to the attitude and position of the test article 84 facilitates accurate assessment of the aerodynamic characteristics of the test article 84 at each unique attitude and/or position. Furthermore, the scanning system 12 may be adapted to the response of control surfaces 112 such as ailerons and flaps at different control surface 112 settings. For example, the scanning system 12 may be adapted to measure the actual angular deflection of control surfaces 112 as compared to a commanded or pre-set control surface 112 deflection angle. A variety of other benefits are achievable using the monitoring system 10 as disclosed herein and are not limited to measuring attitude, position and deformation of the test article 84 for correlation to the forces and moments acting on the test article 84.

Referring still to FIG. 1, as indicated above, the scanning system 12 may comprise any suitable optical sensor 14 including, but not limited to, any suitable laser scanner 16 configuration. For example, the scanning system 12 may comprise one or more laser point scanners, laser stripe scanners and/or three-dimensional laser scanners. As known in the art, a laser point scanner is adapted for emitting a non-movable or a stationary laser beam 32. The laser stripe scanner is adapted for emitting a laser beam 32 which may be swept at a high rate of speed through a scan angle $\theta_{scan}$ in order to essentially create a laser plane 36. A rotating cylindrical lens may be used to transform the stationary laser beam 32 into what appears as a laser plane 36. A three-dimensional laser scanner is configured to project a three-dimensional laser onto a surface to be scanned.

Although a variety of different configurations of laser scanners 16 may be used, for purposes of the present disclosure, the scanning system 12 is described in relation to a laser stripe scanner configured for projecting a laser stripe 34 onto the test article 84 as well as onto the support mechanism 152 and/or the tunnel walls 140 of a fluid tunnel 134. The laser stripe scanner may be configured in one of several arrangements including, but not limited to, a time-of-flight scanner 20 and a triangulation scanner 18 as shown respectively in FIGS. 7 and 8 and as will be described in greater detail below. The laser scanner 16 may be adapted to project the laser stripe 34 along the test article 84. Reflected light 38 is reflected off of the article surfaces 126 of the test article 84, tunnel walls 140 and support surfaces 156 of the support mechanism 152. The reflected light 38 is received by a receiver 26 of the laser scanner 16 in order to generate data that is representative of the position of a plurality of points on the surfaces that are scanned by the laser scanner 16.

The positional data generally comprises information regarding the location of each point which may be defined via an appropriate reference system in Cartesian coordinates and/or in spherical coordinates relative to the laser scanner 16 or relative to some another reference point such as a predetermined location in the fluid tunnel 134. For example, the positional data of each point may be defined relative to a coordinate system oriented as shown in FIG. 1 and indicated as tunnel reference system 146. As shown, the tunnel reference system 146 may be oriented such that the x-axis is positive in the forward direction relative to the test article 84, the y-axis being positive when extended to the right relative to the x-axis in the forward direction and the z-axis being positive in a downward direction. However, other orientations of the axes of the reference system and other locations of the origin are contemplated. The tunnel reference system 146 origin and, hence, the relative location of each point for which positional data is gathered, may be defined about any convenient location such as, for example, a pivot axis of the support mechanism 152 as shown in FIG. 1 and indicated as the tunnel reference system origin 148.

As shown in FIG. 1, the laser scanner 16 may project a laser stripe 34 along any surface of the test article 84 such as along an upper article surface 126 of the aircraft 98. One or more target points 130 on the article surface 126 along the laser stripe 34 may be selected and compared with a second set of positional coordinates from the same target points 130 in order to monitor attitude and position changes of the test article 84, support mechanism 152 (e.g., sting 154) and/or the tunnel walls 140 and any other structure or mechanism that may be associated with fluid tunnel 134. For example, target points 130 on the wall surface 142 of the tunnel walls 140 and on the support surface 156 of the support mechanism 152 may be compared with one another in order to compensate for any displacement in the tunnel walls 140 or deflection in the support mechanism 152.

Referring to FIG. 2, shown is a side view of the wind tunnel 136 having the test article 84 mounted therewithin and supported by the support mechanism 152. As can be seen, the scanning system 12 is communicatively coupled to the computer system 66 which, in one embodiment, comprises an attitude control system 70 or support control 164 for regulating movement of the support mechanism 152 and the test article 84. The computer system 66 may further comprise a processor 68 for receiving positional data from the scanning system 12 and a control loop 72 for reconciling command signals representative of a desired attitude 122 and position of the test article 84 with the positional data representative of the current attitude 120 and position of the test article 84.

Figure 9:
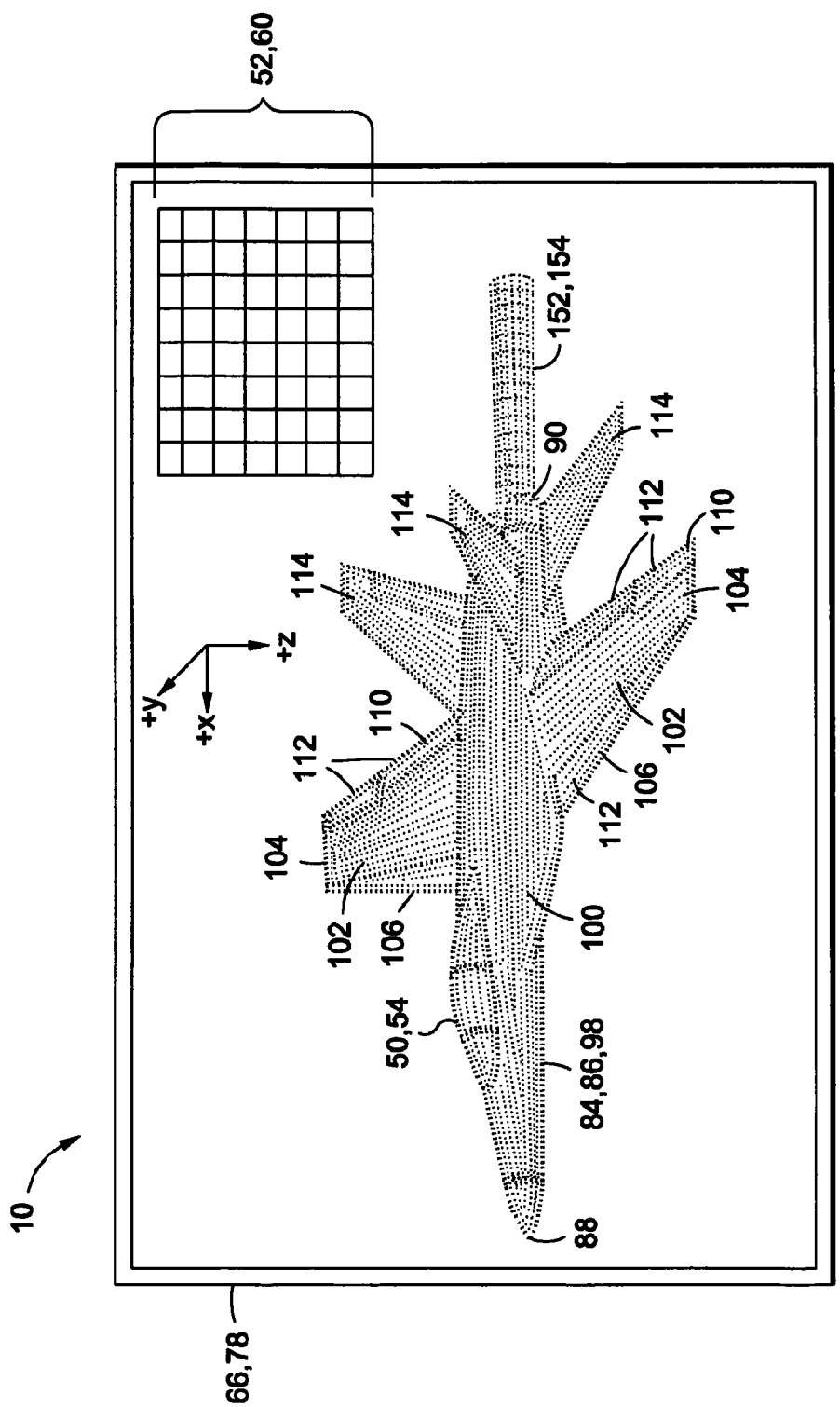
FIG. 9 is a perspective view of a point cloud of the test article comprising a plurality of points for which positional data may be measured by the laser scanner.
Figure 10:
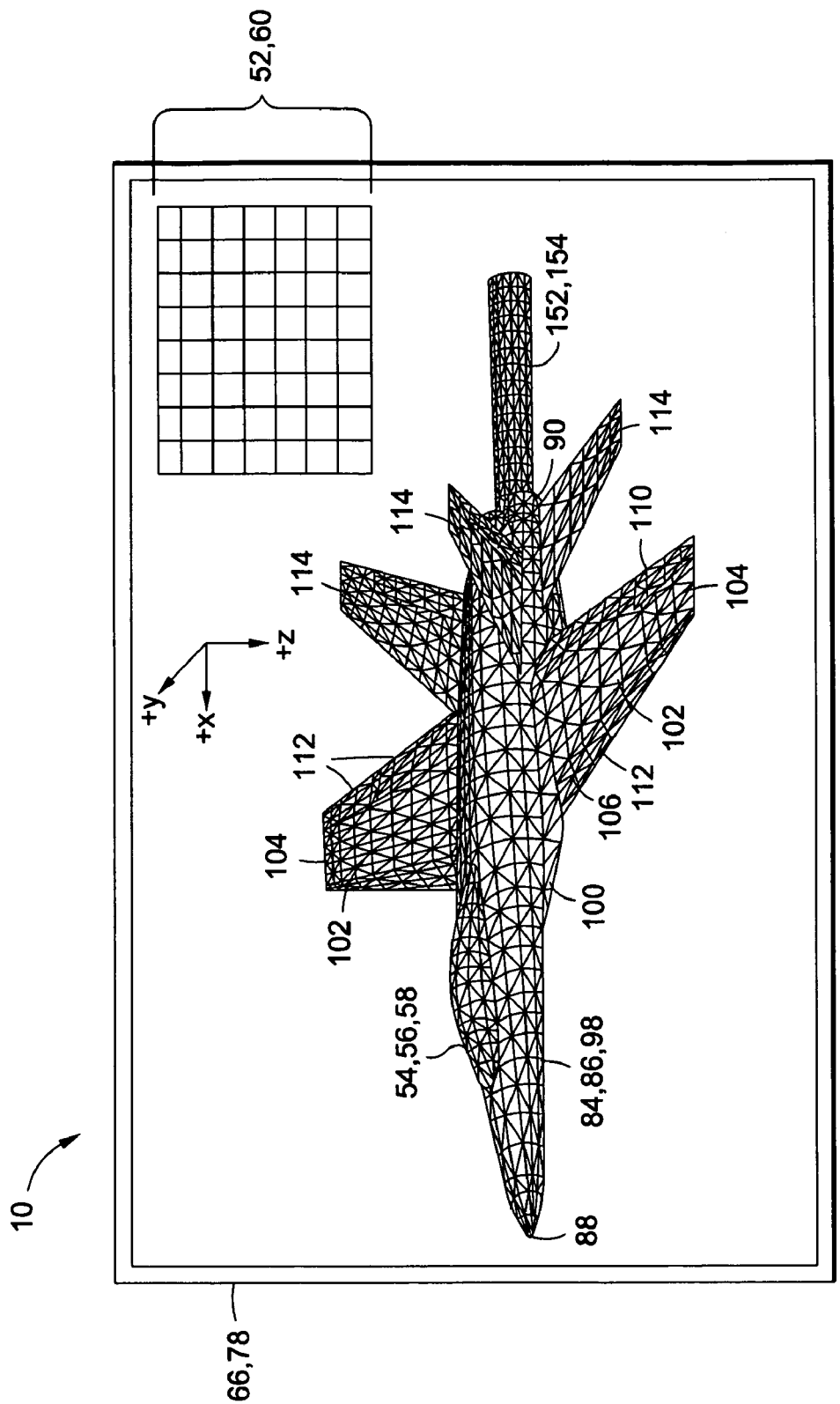
FIG. 10 is a digital model of the test article generated by reconstructing the point cloud.

The computer system 66 may further comprise a data acquisition 74 component which may include data reduction with appropriate algorithms and methodologies for processing the measured data. The computer system 66 may be adapted to present data representative of the real-time attitude, position and/or deformation of the test article 84 in graphic or tabular form as illustrated in FIGS. 9 and 10. In presenting a graphic image of the test article 84, a point cloud 50 may be constructed from the positional data to generate a digital model 54 of the test article 84. The digital model 54 may be graphically displayed on a display device 78 which may include the presentation of tabular data 60 of selected points or areas of interest 128 of the test article 84. The graphic and/or tabular data 60 may be presented in real-time and/or may be stored for later review. The computer system 66 may further include the display device 78 such as a monitor of a PC, laptop, Palm Pilot or any other suitable display mechanism for viewing the results of testing such as via the display of the digital model 54 and/or tabular data 60.

The test article 84 may be configured to be movable to one or more attitudes and/or positions. For example, as shown in FIG. 2, the scale model 86 aircraft 98 may be positionable at a desired attitude 122 which may comprise a change in roll, pitch and/or yaw. The support control 164 of the computer system 66 may regulate movement of the scale model 86 aircraft 98 via the support mechanism 152 by adjusting the attitude from a current attitude 120 to a desired attitude 122 as shown in FIG. 2. The scale model 86 aircraft 98 may define a pitch angle $\theta_{pitch}$ relative to horizontal H. The current attitude 120 of the aircraft 98 may be defined as the current pitch angle. The desired attitude 122 of the aircraft 98 may be defined as the desired pitch angle. The current pitch angle may be determined using positional data gathered by the scanning system 12 wherein transmitted light 30 projected from the laser scanner 16 may monitor and record positional data of one or more target points 130 on the article surface 126 of the aircraft 98.

As shown in FIGS. 1 and 2, the target points 130 may be located at any point along the laser stripe 34 that is projected onto the scale model 86 aircraft 98 such as along the upper surface of the fuselage 100 adjacent the forward and aft ends 88, 90. The same laser stripes 34 may also be projected along the support mechanism 152 (e.g., along an upper location thereof) and/or along a floor of the fluid tunnel 134 (i.e., along the tunnel wall 140) as best seen in FIG. 1. Positional data regarding the target points 130 may be representative of the current attitude 120 of the aircraft 98 and may be transmitted to the processor 68. A desired attitude 122 of the aircraft 98 may be entered into the control loop 72 and reconciled with the current attitude 120 such that the support control 164 causes the support mechanism 152 to rotate the scale model 86 aircraft 98 through a pitch angle $\theta_{pitch}$. The scanning system 12 may continuously adjust the attitude of the aircraft 98 using the positional data gathered by the scanning system 12 for feedback into the control loop 72. In this manner, the monitoring system 10 facilitates real-time control of the attitude and/or position of the test article 84.

As was earlier indicated, the wind tunnel 136 is operable in one or more modes including, but not limited to, a wind-off mode corresponding to the absence of fluid flowing through the wind tunnel 136 (i.e., flowing relative to the test article 84) and a wind-on mode corresponding to the presence of fluid flowing through the wind tunnel 136 and passing over the test article 84. Control of the attitude and/or position of the test article 84 may occur while scanning the test article 84 with the wind tunnel 136 in the wind-off mode and/or in the wind-on mode. For example, the test article 84 may be initially positioned at a current pitch angle $\theta_{pitch}$ followed by scanning with the wind tunnel 136 in the wind-off mode. The test article 84 may then be moved to the desired pitch angle $\theta_{pitch}$ wherein the test article 84 may be scanned with the wind tunnel 136 still in the wind-off mode. The test article 84 may then be moved back to the current pitch angle $\theta_{pitch}$ followed by scanning with the wind tunnel 136 in the wind-on mode. The test article 84 may then be moved to the desired pitch angle $\theta_{pitch}$ while scanning the test article 84 with the wind tunnel 136 in the wind-on mode. During each scan, positional data may be gathered in order to monitor the response of the test article 84 to fluid passing over the article surfaces 126. Positional data of the article surfaces 126 in the wind-on mode may be determined by comparing digital models 54 of the test article 84 or of localized areas of interest 128 on the test article 84. The digital models 54 such as that which is shown in FIG. 10 may be reconstructed from the point clouds 50 such as that which is shown in FIG. 9. The point cloud 50 may be generated from the positional data in each of the wind-off and wind-on modes for each attitude (i.e., at the current pitch angle $\theta_{pitch}$ and at the desired pitch angle $\theta_{pitch}$). The digital models 54 in the wind-off and wind-on modes at each attitude may be compared such as by selecting a common target point 130 on the test article 84 and comparing the positional data of the target point 130.

Likewise, response of the support mechanism 152 to changes in attitude of the test article 84 may be captured by comparing the movement of one or more selected points within either the point cloud 50 or within the reconstructed digital model 54 at the current and desired pitch angles $\theta_{pitch}$ and with the fluid tunnel 134 in the wind-off and/or wind-on modes. As shown in FIG. 2, the laser scanner 16 may be positioned at the bottom of the wind tunnel 136 and may project a laser stripe 34 along a lower article surface 126 of the sting 154. One or more target points 130 along the laser stripe 34 may be selected for comparison in the wind-off and wind-on modes in order to detect deflection in the sting 154 or other hardware included in the support mechanism 152. Although only two target points 130 are illustrated in FIG. 2 along the sting 154, any number of points may be selected to provide accurate feedback on deflection of the sting 154.

Figure 3:
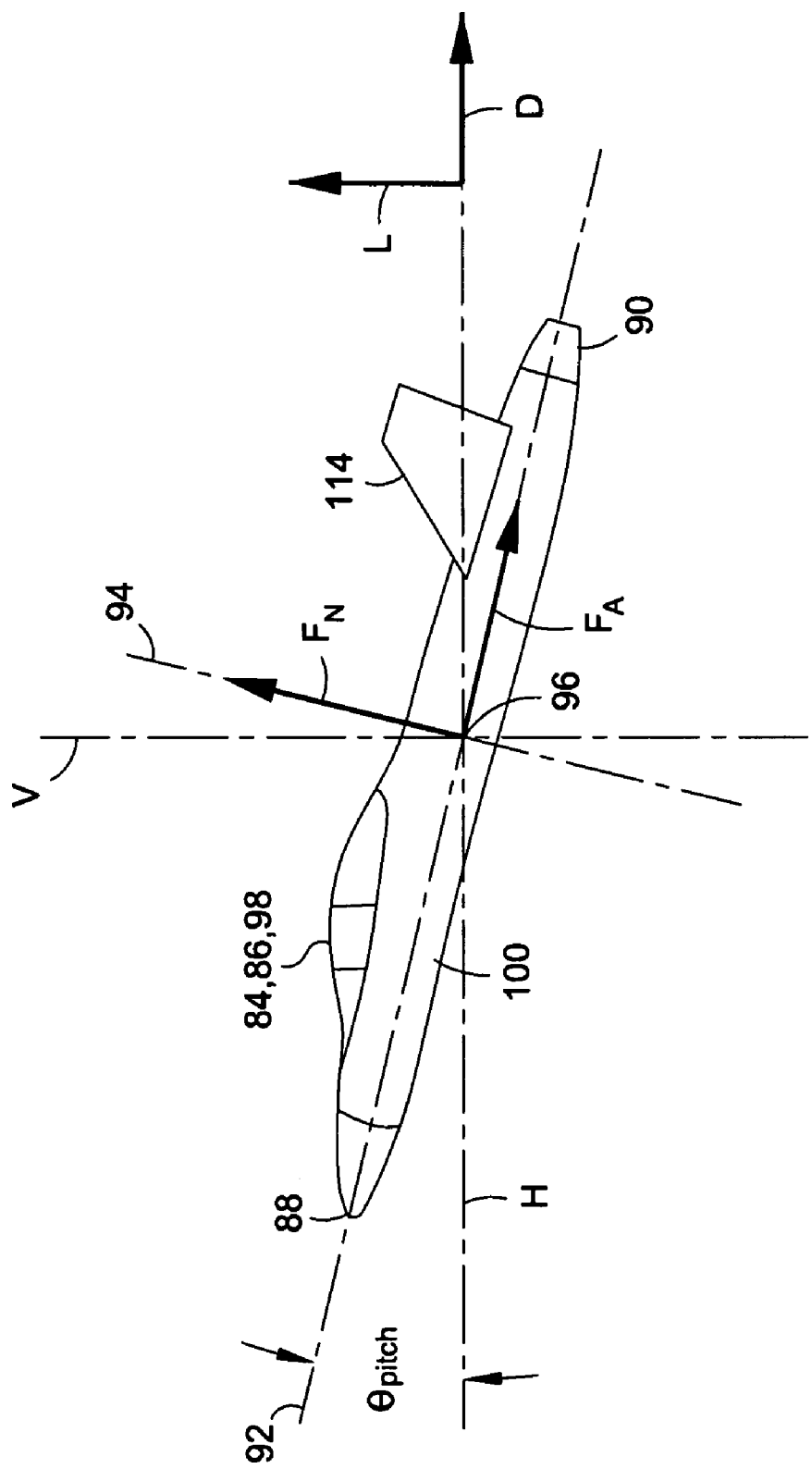
FIG. 3 is a side view of the test article schematically illustrating two of the aerodynamic forces (i.e., L=lift, D=drag) which may act on the test article.

Referring briefly to FIG. 3, shown is a side view of the fluid tunnel 134 illustrating one or more force and/or moments that may act on the test article 84 such as the scale model 86 aircraft 98. For example, during testing with the fluid tunnel 134 in a wind-on mode, the aircraft 98 may develop lift L which is conventionally represented as being oriented parallel to vertical V. Drag D may also be exerted on the aircraft 98 as a result of fluid flowing over the aircraft 98 surfaces and is conventionally represented as being oriented parallel to horizontal H. In determining aerodynamic drag D exerted on the aircraft 98, accurate determination of the actual pitch angle $\theta_{pitch}$ of the aircraft 98 is required as illustrated by the following equation:

$$D = F_A \cos\theta_{pitch} + F_N \sin\theta_{pitch}$$

In the above equation, $F_A$=aft force, $F_N$=normal force, and $\theta_{pitch}$=pitch angle of the aircraft 98 relative to the horizon H. The aft force $F_A$ extends along the longitudinal axis 92 of the aircraft 98. The normal force $F_N$ extends along an axis that is oriented perpendicularly relative to the longitudinal axis 92 of the aircraft 98. As is well known, changes in pitch angle $\theta_{pitch}$ may correspond to changes in drag D on the aircraft 98. Such drag D forces may be measured by instrumentation such as strain gauges which may be incorporated into the balance 158 as part of the instrumentation for sensing and measuring loads on the aircraft 98. The monitoring system 10 may be configured to display forces and/or moments as a data set 52 of tabular data 60 while simultaneously displaying a graphic image of the digital model 54 during testing. The display of the digital model 54 along with the corresponding force and moment data may be in real-time or at a later time. The scanning of the test article 84 and measurement of the forces and/or moments may be performed on a point-and-pause basis or on a continuous basis as the aircraft 98 is moved to different attitudes and/or positions. Point-and-pause scanning may comprise incrementally moving the test article 84 to different attitudes while incrementally recording positional data and/or while measuring forces and moments at each attitude. Continuous scanning and force/moment measurement comprises continuously scanning while moving the test article 84 between different attitudes and/or positions. During scanning, the resulting positional data and force/moment data may be correlated to other wind tunnel 136 data gathered by other instrumentation for analysis in real-time or following testing.

Referring to FIG. 4, shown is a front view of the fluid tunnel 134 taken along line 4-4 of FIG. 2 and illustrating the relative positioning of the scanning system 12 and the test article 84 in the fluid tunnel 134. In the embodiment shown, the scanning system 12 may comprise a set of laser scanners 16 mounted on a corresponding set of tunnel walls 140. Although four laser scanners 16 are shown in FIG. 4, as was earlier mentioned, any number may be provided and in any configuration, spacing and arrangement. The laser scanners 16 may be individually activated on an as-needed basis or all the laser scanners 16 may be simultaneously activated depending on factors such as, without limitation, the size, shape and configuration of the test article 84 and the size, shape and configuration of the fluid tunnel 134. FIG. 4 illustrates the capability of the scanning system 12 to monitor, detect and/or measure relative movement of the fluid tunnel 134 during testing. For example, with the fluid tunnel 134 in the wind-on mode, aerodynamic pressure fluctuations or vibrations induced by machinery may cause displacement in one or more of the tunnel walls 140 which, in turn, may cause a laser scanner 16 mounted to the tunnel wall 140 to also vibrate. The laser scanners 16 on adjacent walls may be adapted to scan other adjacent or oppositely-located tunnel walls 140 to measure displacement thereof and compensate for such displacement in the positional data of the test article 84. Parameters of the laser scanner 16 such as depth of view, field of view and resolution may be selected such that the laser scanner 16 may accurately measure displacement of adjacent or opposite tunnel walls 140 in addition to measuring the test article 84.

In an embodiment, the monitoring system 10 may be configured to evaluate the response of an area of interest 128 such as the wing tips 104 of the aircraft 98 under certain flow conditions. For example, the area of interest 128 may be evaluated with the aircraft 98 oriented at a certain attitude (i.e., pitch angle $\theta_{pitch}$). The monitoring system 10 may be configured to scan the wing tips 104 and record positional data of a plurality of points on the article surfaces 126 at the wing tips 104. Response of the wing tips 104 as measured by the monitoring system 10 is shown in exaggerated form in FIG. 4 and is indicated by the tip displacement $\Delta_{tip}$. During scanning of the wing tips 104, one or more target points 130 may be monitored to detect and measure relative displacement of the wing tip 104 in response to aerodynamic forces. Alternatively, a multitude of target points 130 on the wing tip 104 may be monitored as the laser beam 32 is scanned and/or swept across the test article 84. In this regard, the laser scanners 16 may be operated such that the laser beam 32 is scanned through a scan angle $\theta_{scan}$ as illustrated in FIG. 1 such as by using a rotating mirror to generate a laser plane 36 projected as the laser stripe 34 along the test article 84. In addition, the laser plane 36 may be pivotally swept through a sweep angle $\theta_{sweep}$ as shown in FIG. 4 to effectively provide three-dimensional scanning of the test article 84 in a manner known in the art.

Referring to FIGS. 7 and 8, shown respectively are laser scanners 16 in a time-of-flight configuration and in a triangulation configuration. Each one of the laser scanner 16 configurations is shown mounted adjacent to or on a tunnel wall 140 such that the laser scanner 16 is preferably, but optionally, flush with the wall surface 142 to avoid disrupting the aerodynamics of the fluid tunnel 134. The time-of-flight laser scanner 20 configuration shown in FIG. 7 may comprise a transmitter 22, a receiver 26 and appropriate optics 24 and may be operative in one of two modes. In a first mode of operation for a time-of-flight laser scanner 20, the laser beam 32 is emitted in a pulse mode by the transmitter 22. The pulses of transmitted light 30 are reflected against the test article 84 surface which is illustrated as the wing tip 104 of the aircraft 98. At least a portion of the reflected light 38 pulses are transmitted through the optics 24 and are received by the receiver 26 which may be configured as a charge coupled device (CCD) image sensor or as any other suitable sensor or camera 28 configuration. The amount of travel time from emission of the transmitted light 30 pulses to receipt of the reflected light 38 by the receiver 26 is representative of the distance from the laser scanner 16 to the article surface 126. A large number of pulses may be emitted by the transmitter 22 in order to increase the measurement accuracy by averaging the travel time. A second mode of operation for a time-of-flight laser scanner 20 includes the use of a continuously emitted beam of laser light which may be amplitude or frequency modulated in a manner well known in the art. The phase difference between the reflected light 38 at the receiver 26 as compared to the emitted laser beam 32 corresponds to the distance from the laser scanner 16 to the article surface 126.

In FIG. 8, the triangulation laser scanner 18 comprises similar components including the transmitter 22, appropriate optics 24 and the receiver 26. Using the known values of the angle at which the laser beam 32 is emitted from the transmitter 22 and the known distance from the transmitter 22 to the receiver 26, the angle at which the reflected light 38 is received at the receiver 26 can be determined by measuring the location on the receiver 26 at which the reflected light 38 is received. The location of the points on the surface of the test article 84 can be determined by triangulating the angle and distance data. In each of FIGS. 7 and 8, relative movement of target point 130 locations on the article surfaces 126 may be monitored and measured by scanning the article surfaces 126 with the laser scanners 16. For example, changes in angle of attack α represented by the angle between the wing 102 chord line 108 relative to oncoming fluid flow 138 may be accurately measured by monitoring the relative movement of target points 130 on the article surfaces 126 of the wing 102 such as at the leading and/or trailing edges 106, 110 and/or at intermediate locations.

Figure 6:
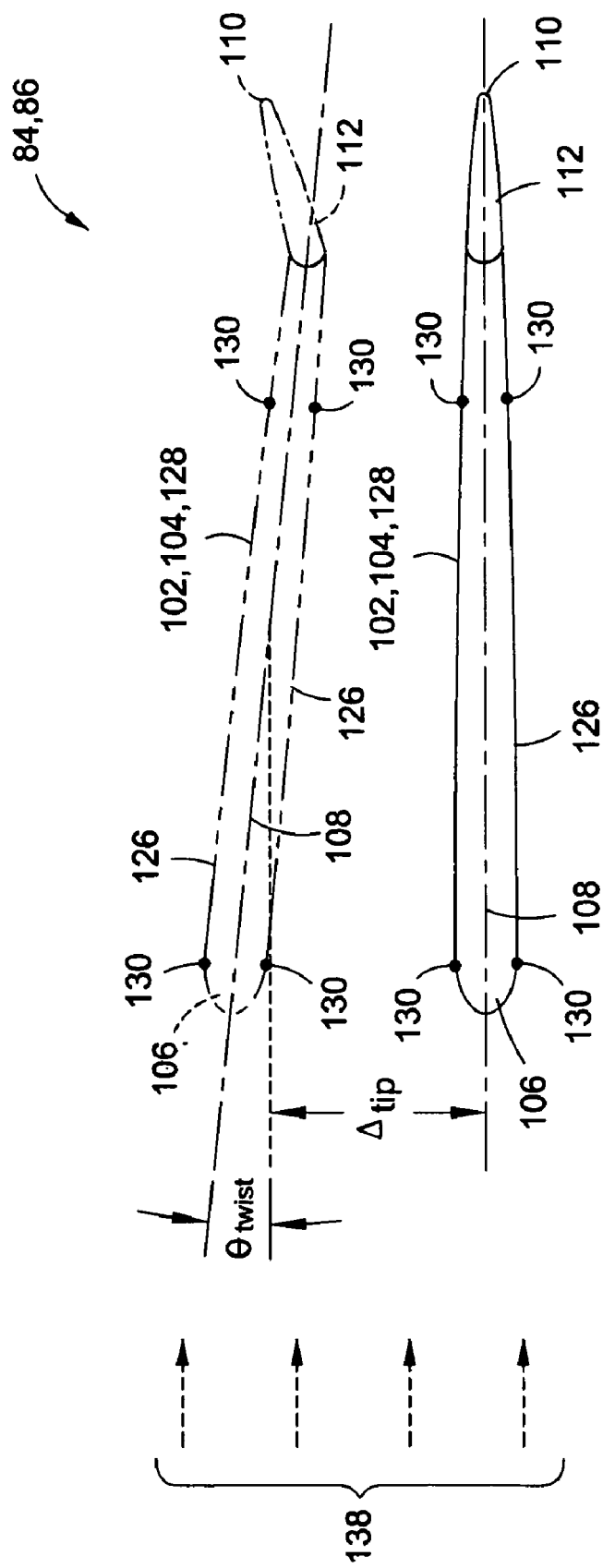
FIG. 6 is a side view of a wing of the test article taken along line 6-6 of FIG. 4 and illustrating wing tip displacement $\Delta_{tip}$ and wing twist $\theta_{twist}$ as a result of aerodynamic load on a wing of the test article.

Referring to FIG. 6, target points 130 on the underside of the wing 102 and on the upper side of the wing 102 at the leading 106 and trailing edges 110 may be monitored amongst the multitude of points for which positional data is gathered by the scanning system 12. Tip displacement $\Delta_{tip}$ at the wing tip 104 as a result of fluid flow 138 over the wing 102 may also include wing twist $\theta_{twist}$ shown in exaggerated form in FIG. 6. The wing twist $\theta_{twist}$ of the wing tip 104 may be expressed relative to any suitable reference feature such as the angle of the chord line 108 when the wing 102 is in an undeformed (i.e., illustrated in FIG. 6 as the lower wing 102) as compared to the twisted configuration of the wing 102 (i.e., illustrated in FIG. 6 as the upper wing 102). Although the target points 130 are shown on the leading 106 and trailing edges 110 of the wing 102, any number of target points 130 at any of a variety of different locations may be used. Likewise, deflection of control surfaces 112 such as the control surfaces 112 located at the wing 102 trailing edge 110 in FIG. 6 may also be monitored and measured using the monitoring system 10 in a manner similar to that which is described above for the wing tip 104.

Figure 5:
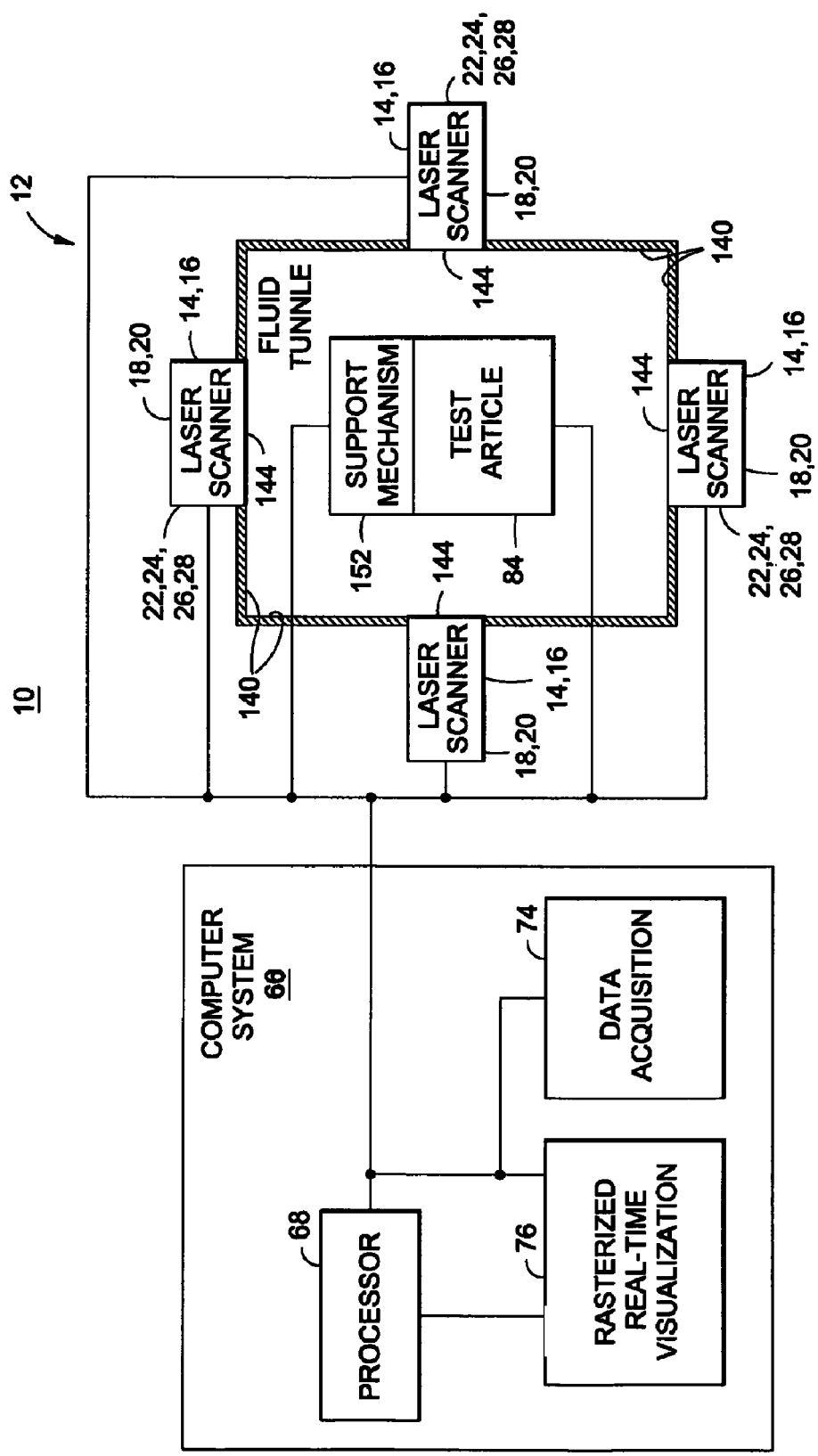
FIG. 5 is a block diagram of the monitoring system comprising the computer system and the scanning system.

Referring briefly to FIG. 5, shown is a block diagram of the monitoring system 10 comprising the scanning system 12 and the computer system 66. The scanning system 12 is preferably communicatively linked either by hardwire and/or wirelessly to the computer system 66 such that the positional data gathered by each laser scanner 16 in the scanning system 12 is transmitted to and received by the processor 68. The individual point clouds 50 gathered by each of one of the laser scanners 16 may be aligned or registered with one another in order to form a single, unitary point cloud 50 representative of the test article 84, support mechanism 152, tunnel walls 140 and any other objects associated with testing. The processor 68 may transmit the unitary point cloud 50 to a rasterized real-time visualization block or program 76 via a graphical display on a display device 78. The positional data may be directly fed to the rasterized real-time visualization program 76 and/or to the data acquisition 74 block for archiving and/or correlating to other test data acquired during testing.

Referring to FIG. 9, shown is the point cloud 50 of the positional data gathered by the laser scanners 16. As is known in the art, the point cloud 50 may be used to generate the digital model 54 of the test article 84 and/or area of interest 128 of the test article 84. The digital model 54 may be representative of the response of the test article 84 in real-time to aerodynamic loads induced on the test article 84. As was indicated above, the monitoring system 10 facilitates real-time visualization of the response of the test article 84 during changes of attitude and/or position. The point cloud 50 and/or digital model 54 as shown in FIG. 9 may be displayed on a suitable display device 78 such as that which is also shown in FIG. 2. In addition, the positional data may be presented as a data set 52 in tabular form such as in a tabular data 60 block. For example, such information may include an identification of the particular target point 130 and its location on the test article 84 in Cartesian and/or spherical coordinates. Changes in attitude and/or position of the test article 84 may be presented in tabular form along with changes in magnitude of forces or moments on the test article 84 in a wind-off versus a wind-on condition and the tunnel operating parameters in the wind-on mode. As may be appreciated, a variety of different parameters may be presented in graphical and or tabular form on the display device 78.

In an embodiment, the display device 78 may also be configured as a user interface 80 such as a touch screen or keyboard as shown in FIG. 2 for manipulating the attitude and/or position of the test article 84 as well as for regulating operation of the wind tunnel 136. Other capabilities are contemplated for the monitoring system 10 including, but not limited to, the ability to scan and monitor response of one or more test articles 84 such as stores and weapons carried by the test article 84 for integration testing including response of the test article 84 during store release or ejection from the test article 84.

Referring to FIG. 10, shown is a digital model 54 which may be reconstructed from positional data and which may be presented in one or more forms such as, without limitation, a wireframe model 56 or a surface model 58. The wireframe model 56 shown in FIG. 10 may be formed by interconnecting selected points of the point cloud 50 that best approximate the surface contour of the test article 84. The wireframe model 56 may be displayed as a polygonal mesh. For example, as shown in FIG. 10, the wireframe model 56 may be constructed as a mesh of triangles each sharing common vertex points in the point cloud 50. A surface model 58 may also be formed as a continuous surface using software and methods known in the art.

The monitoring system 10 provides a means for measuring deformation in the test article 84. For example, in an embodiment, deformation may be measured by scanning the test article 84 in the wind-off mode, then scanning the test article 84 in the wind-on mode, followed by comparing the digital models 54 of the test article 84 in the wind-off and wind-on modes. The digital models 54 may be superimposed to provide a graphical display of the deformation which may also be magnified by a predetermined amount to facilitate real-time visual detection of deformation in the test article 84. The superimposed digital models 54 may also be displayed on the display device 78. As was earlier indicated, the monitoring system 10 facilitates the ability to display a digital model 54 of the entirety of the test article 84 or deformation of an area of interest 128 such as the wing tip 104 as shown in FIGS. 1-6. The computer system 66 is also operative to regulate movement of the test article 84 while simultaneously displaying the digital model 54. Even further, the computer system 66 may be operative to display the digital models 54 of the support surface 156 and/or of the tunnel walls 140 along with the digital model 54 of the test article 84.

Figure 11:
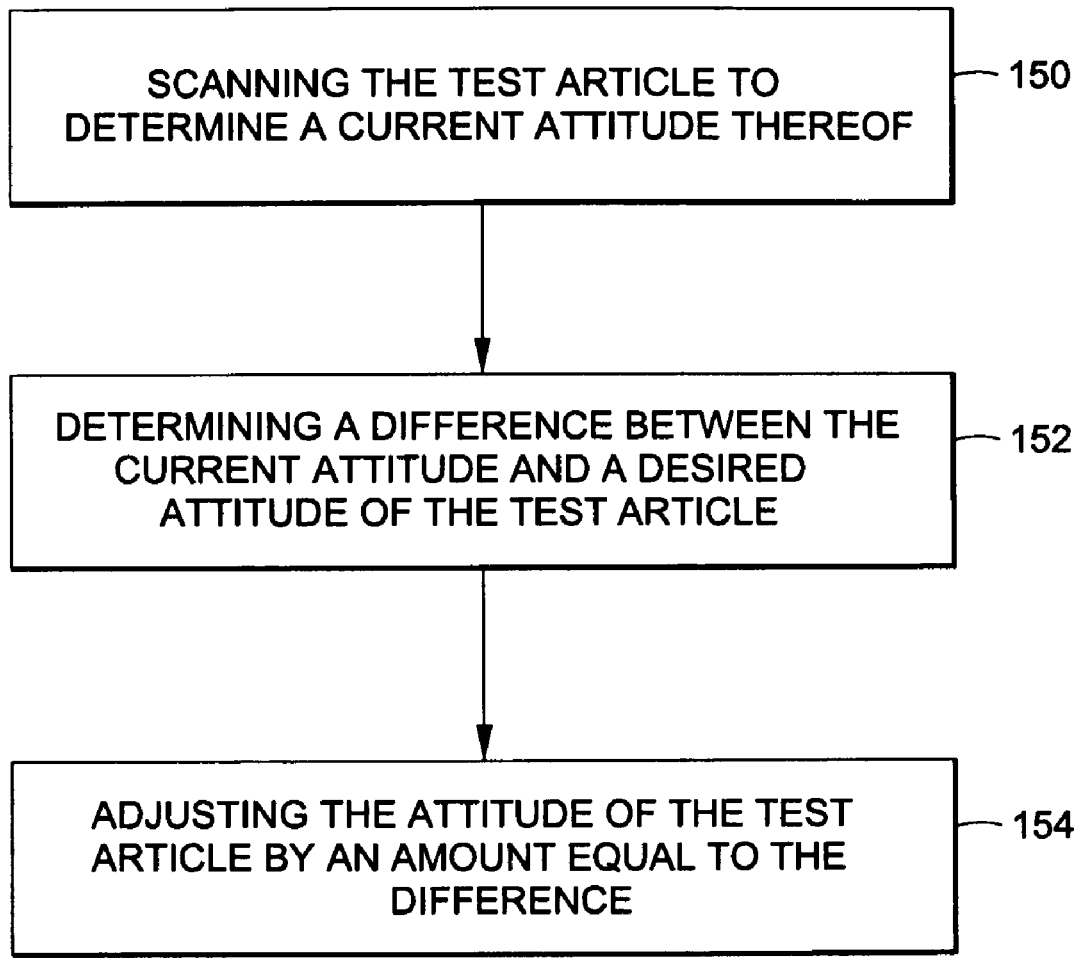
FIG. 11 is a methodology of controlling the test article.

In operation and referring initially to FIG. 11, the monitoring system 10 facilitates a method of controlling the test article 84 within the fluid tunnel 134 such as the aircraft 98 shown in FIGS. 1-6. Step 150 may comprise scanning the test article 84 in a manner as was described above in order to determine a current attitude 120 thereof. For example, the current attitude 120 of the aircraft 98 may comprise the current pitch angle $\theta_{pitch}$ of the aircraft 98 relative to horizontal H. Step 152 may comprise determining the difference between the current attitude 120 and the desired attitude 122 of the test article 84. For example, as shown in FIG. 2, the aircraft 98 may be positioned at the current pitch angle $\theta_{pitch}$ and testing may require movement of the aircraft 98 to the desired pitch angle $\theta_{pitch}$. Step 154 comprises adjusting the attitude of the test article 84 by an amount equal to the difference between the current attitude 120 and the desired attitude 122. For example, adjustment of the aircraft 98 in FIG. 2 may comprise moving the aircraft 98 through pitch angle $\theta_{pitch}$ which may be equivalent to the difference between the desired pitch angle $\theta_{pitch}$ and the current pitch angle $\theta_{pitch}$. The above described steps may be performed with the fluid tunnel in the wind-off or the wind-on mode.

The steps of scanning the test article 84, determining the difference between the current attitude 120 and the desired attitude 122, and adjusting the attitude of the test article 84 by an amount equal to the difference may be continuously repeated in a control loop 72 as the test article 84 is moved through a succession of desired or subsequent attitudes 124. In an embodiment, the test article 84 may comprise the aircraft 98 or other object and the step of adjusting the attitude may comprise adjusting the roll, pitch and/or yaw angle or orientation of the aircraft 98 or other object relative to the wind tunnel 136. The above noted steps of adjusting the orientation of the test article 84 to the desired attitude 122 may facilitate an accurate determination of various forces and moments acting on the test article 84 at the desired attitude 122. Aeroelastic deformation in the article surfaces 126 as a result of aerodynamic load on the test article 84 may also be measured as the test article 84 is moved through a succession of desired or subsequent attitudes 124. Furthermore, and referring to FIG. 2, the methodology for controlling movement of the test article 84 may further comprise scanning the support mechanism 152 (i.e., sting 154) while scanning the test article 84 in order to determine the existence of deflection (i.e., bending) of the sting 154 or other support mechanism 152 members. Such bending may occur as a result of aerodynamic forces imposed on the test article 84 and which may be translated to the sting 154. By compensating for such deflection when adjusting the attitude of the test article 84, accuracy of the test results may be improved.

As was earlier indicated, the step of scanning the test article 84 includes recording positional data of a plurality of points on the article surface 126 of the test article 84. The digital model 54 of the test article 84 or an area of interest 128 may be generated by first generating the point cloud 50 based on the positional data. The point cloud 50 may comprise a plurality of point clouds 50 generated by each one of the laser scanners 16 viewing the test article 84 from a different angle such as is shown in FIG. 4. Positional data generated by each one of the test articles 84 may be aligned and registered to form a unitary point cloud 50 of the test article 84 which may then be reconstructed into a unitary digital model 54. The digital model 54 may facilitate evaluation of particular locations in the test article 84 to assess the existence of any deformation in the article surfaces 126. The digital model 54 may be displayed while simultaneously adjusting the attitude of the test article 84 such as by displaying a rasterized image of the digital model 54.

Referring to FIGS. 1 and 4, the method of scanning the test article 84 may further comprise scanning the laser beam 32 in order to create the laser stripe 34 on the test article 84. A three-dimensional scan of the test article 84 may be effectively generated by simultaneously sweeping the laser stripe 34 along the test article 84 along a sweep angle $\theta_{sweep}$ that may be oriented perpendicularly or in non-parallel relation to the scan angle $\theta_{scan}$ of the laser beam 32. For example, as shown in FIG. 1, the single laser beam 32 emitted by the transmitter 22 may be effectively formed into the laser plane 36 which appears as the laser stripe 34 on the test article 84 as well as on the tunnel wall 140 surface, and/or on the support surface 156.

Figure 12:
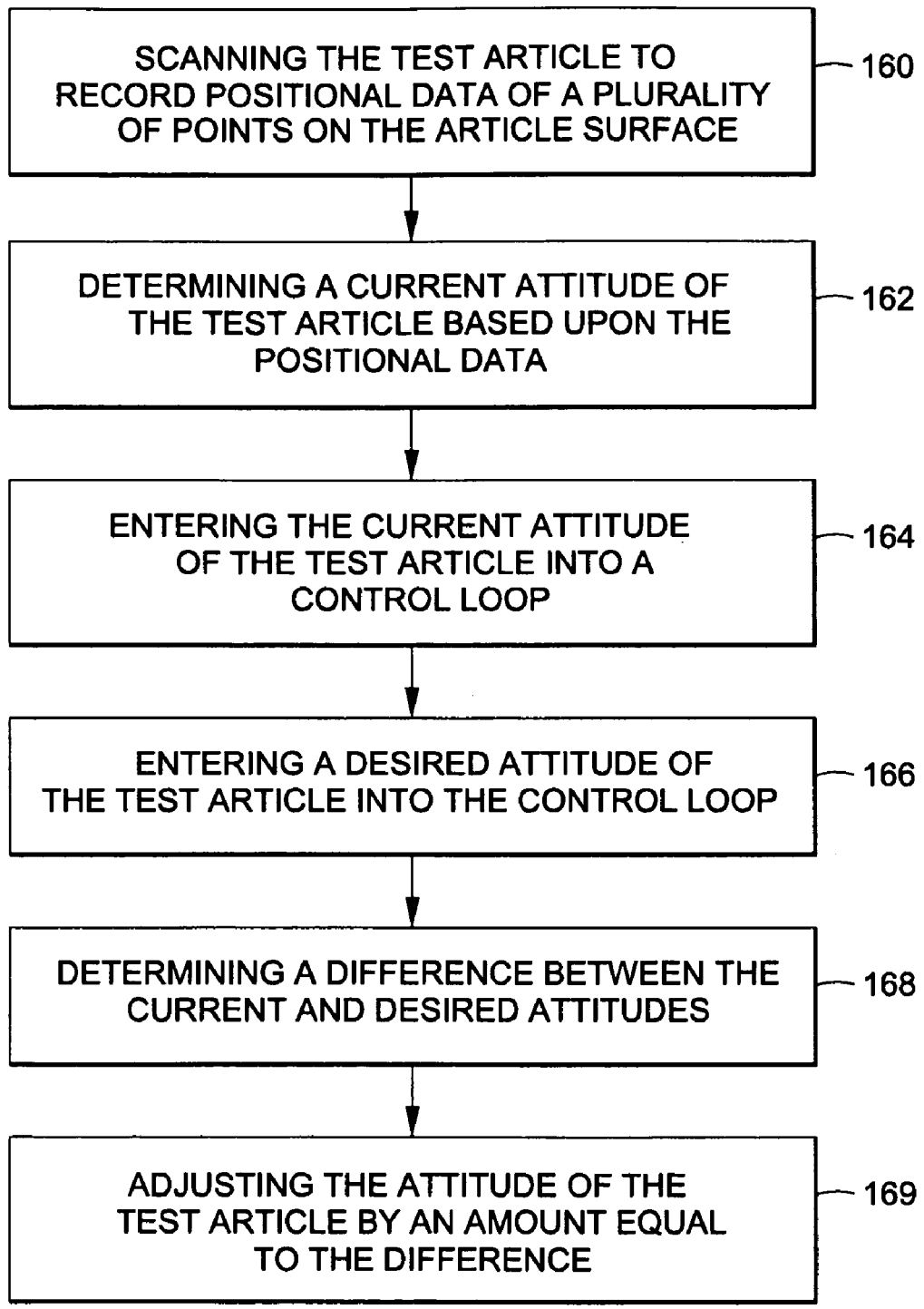
FIG. 12 is a methodology of controlling the test article using a control loop.

Referring to FIG. 12, in an embodiment for controlling the test article 84, step 160 of the methodology may comprise scanning the test article 84 in order to record the positional data of the plurality of points on the article surface 126 followed by step 162 of determining the current attitude 120 of the test article 84 based upon the positional data. Step 164 may comprise entering the current attitude 120 of the test article 84 into the control loop 72 as shown in FIG. 2. As was earlier described, the support control 164 is operative to send signals to the support mechanism 152 for controlling movement of the support mechanism 152. The support mechanism 152 may comprise any suitable mechanism for effecting movement of the test article 84 including, without limitation, the rotation mechanism 162 and the translation mechanism 160 which may each be regulated by the support control 164.

Control of the test article 84 may include step 166 comprising entering the desired attitude 122 of the test article 84 into the control loop 72. As shown in FIG. 2, the test article 84 is shown in solid lines at the current attitude 120 and in phantom lines at the desired attitude 122 after having been swept through pitch angle $\theta_{pitch}$ in response to commands received from the control loop 72. Step 168 comprises determining the difference between the current attitude 120 and the desired attitude 122 in order to orient the test article 84 at the actual attitude as commanded by an operator or by a preprogrammed test sequence. Step 169 may include adjusting the attitude of the test article 84 by an amount equal to the difference between the current attitude 120 and the desired attitude 122.

Figure 13:
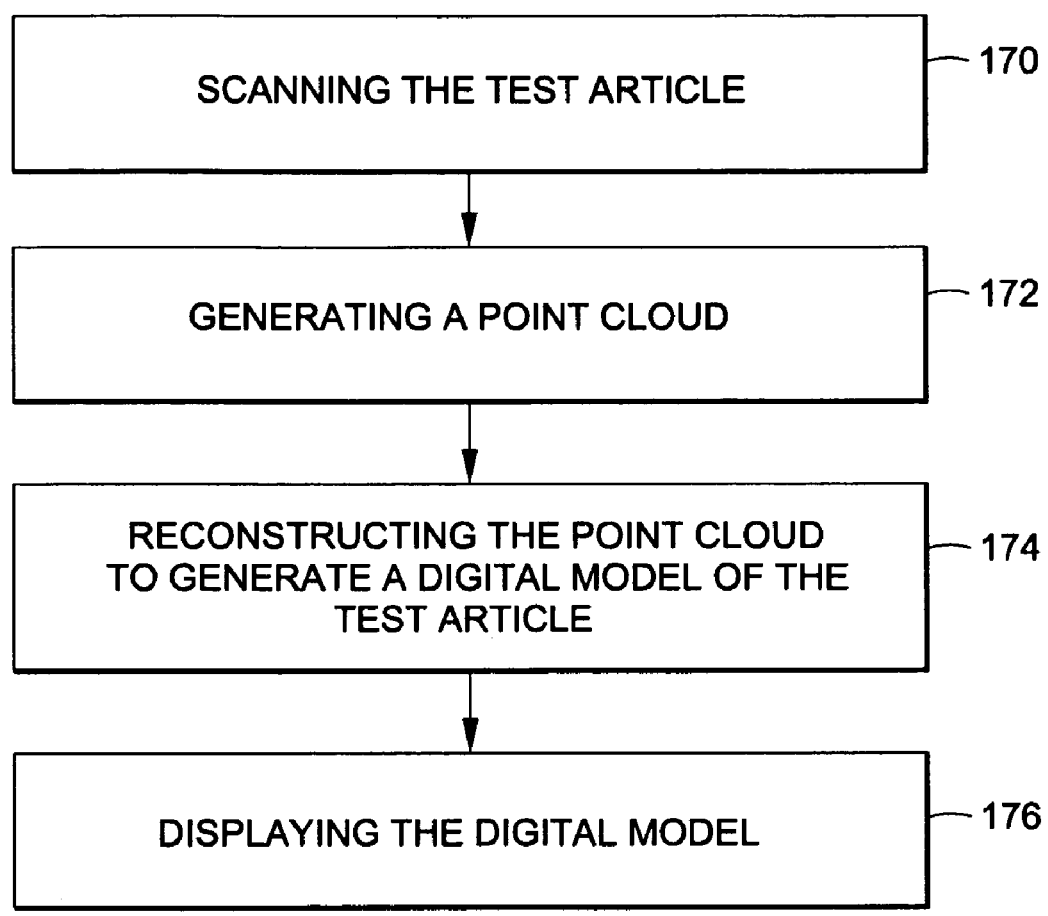
FIG. 13 is a methodology of generating the digital model of the test article.

Referring to FIG. 13, the monitoring system 10 may further include a method for generating the digital model 54 and providing real time visualization of the test article 84 within the fluid tunnel 134. For example, step 170 may comprise scanning the test article 84 in order to generate the point cloud 50 from positional data gathered from each laser scanner 16 in step 172.

Step 174 may comprise reconstructing the point cloud 50 in order to generate the digital model 54 of the test article 84 followed by displaying the digital model 54 of the test article 84 in step 176 as is illustrated in FIGS. 9-10. For example, in FIG. 10, the digital model 54 is illustrated as a wireframe model 56 although a surface model 58 or any other suitable model configuration including a solid model may be displayed.

As was earlier described, the real-time visualization of the test article 84 facilitates measuring deformation that may occur in the test article 84. The method of real-time visualization may comprise the steps of measuring the deformation of the test article 84. The step of measuring the deformation may include scanning the test article 84 in the wind-off mode, scanning the test article 84 in the wind-on mode, and then comparing the digital models 54 of the test article 84 in the wind-off and wind-on modes. Difference between the article surfaces 126 in the wind-off and wind-on modes may be ascertained and presented in either graphical or tabular form. Superimposed digital models 54 of the same area of interest 128 on the test article 84 may be also be displayed on a suitable display device 78 to graphically illustrate the deformation. For example, as shown in FIG. 4, the wing tip 104 may undergo a vertical displacement illustrated as a result of fluid passing over the wing 102. Additionally, or alternatively, the wing tip 104 may be subjected to wing twist $\theta_{twist}$. By comparing the digital model 54 of the wing tip 104 in the wind-off mode versus the digital model 54 of the wing tip 104 in the wind-on mode, the tip displacement $\Delta_{tip}$ may be graphically or tabularly presented. Likewise, displacement of the tunnel wall 140 may be measured while scanning the test article 84 by simultaneously scanning the tunnel wall 140 in the wind-off mode followed by scanning the tunnel wall 140 in the wind-on mode. By comparing the digital models 54 of the tunnel wall 140 in the wind-off and wind-on modes, displacement in the wall may be ascertained and may be graphically and/or tabularly displayed along with the digital model 54 of the test article 84.

Figure 14:
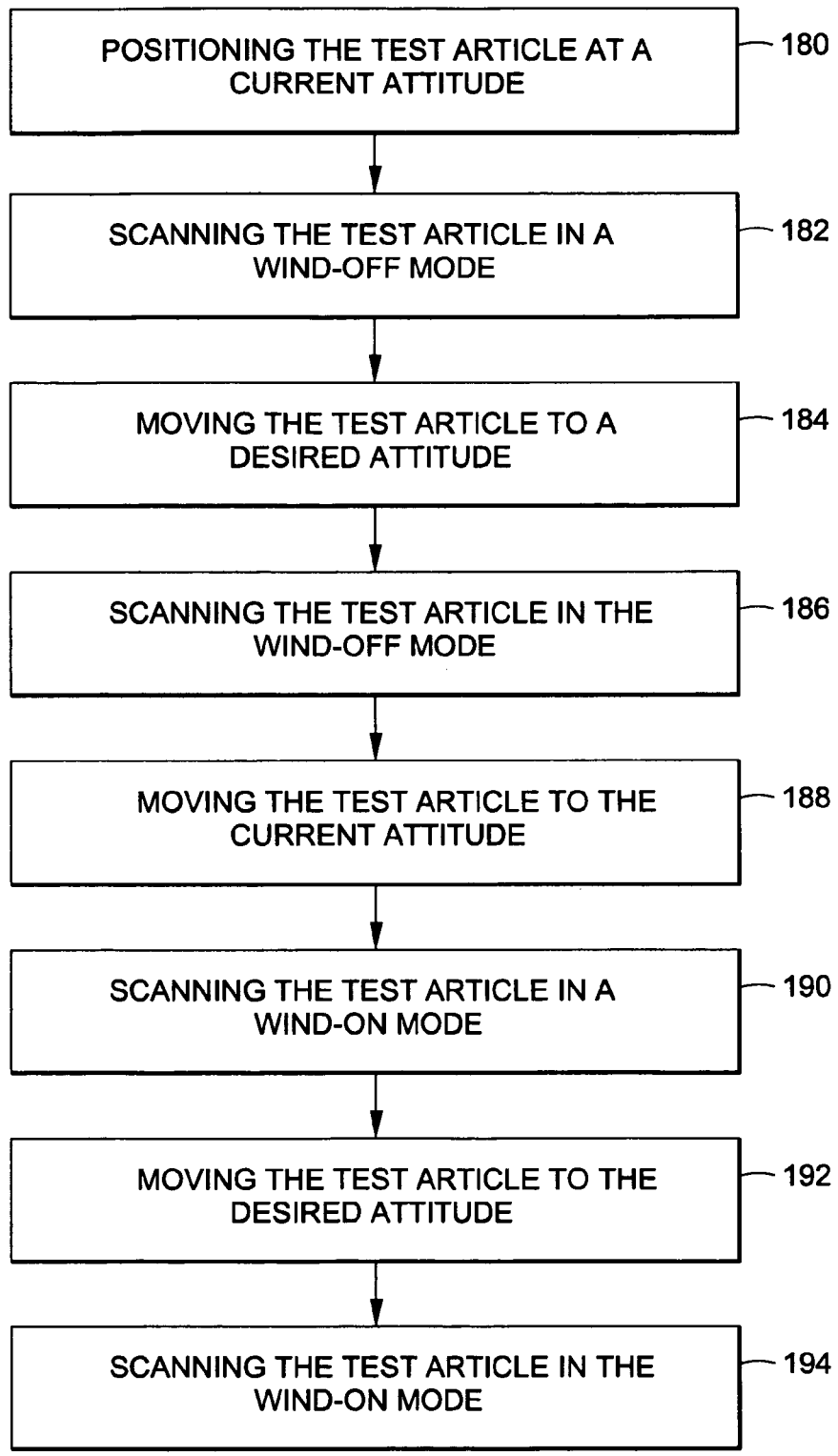
FIG. 14 is a methodology of real-time visualization of the test article.

Referring briefly to FIG. 14, the method of monitoring the test article 84 may comprise step 180 including positioning the test article 84 at the current attitude 120 followed by step 182 of scanning the test article 84 in the wind-off mode. The test article 84 may then be moved to the desired attitude 122 in step 184 followed by scanning the test article 84 with a fluid tunnel 134 in the wind-off mode in step 186. Next, the test article 84 may be moved back to the current attitude 120 in step 188 followed by scanning the test article 84 in the wind-on mode in step 190. The test article 84 may then be moved back to the desired attitude 122 in step 192 followed by scanning the test article 84 in the wind-on mode again in step 194. In this manner, response of the test article 84 when moving from the current attitude 120 to the desired attitude 122 may be ascertained in any one of the above described methodologies.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A monitoring system for monitoring a test article having at least one article surface and being positioned within a fluid tunnel, the monitoring system comprising:
    a scanning system mounted to the fluid tunnel and being configured to scan the test article and record positional data of at least one point on the article surface; and
    a computer system in communication with the scanning system for receiving the positional data and being operative to determine at least one of the following:
    a position of the test article;
    an attitude of the test article;
    deformation of the article surface.

2. The monitoring system of claim 1 wherein:
    the scanning system comprises at least one laser scanner configured as at least one of the following:
    a triangulation scanner;
    a time-of-flight scanner.

3. The monitoring system of claim 1 wherein:
    the scanning system comprises a plurality of laser scanners mounted in spaced relation to one another in the fluid tunnel.

4. The monitoring system of claim 1 wherein:
    the computer system includes a support control configured to regulate movement of the test article from a current attitude to a desired attitude.

5. The monitoring system of claim 1 wherein:
    the attitude comprises at least one of a roll, pitch and yaw of the test article.

6. The monitoring system of claim 5 wherein:
    the test article is configured as an aircraft defining a pitch angle relative to horizontal;
    the current attitude and the desired attitude comprise a current pitch angle and a desired pitch angle of the aircraft, respectively.

7. A monitoring system for monitoring a test article having at least one article surface and being positioned within a fluid tunnel, the monitoring system comprising:
    a scanning system configured to scan the test article and record positional data of at least one point on the article surface; and
    a computer system in communication with the scanning system for receiving the positional data and being operative to determine at least one of the following:
    a position of the test article;
    an attitude of the test article;
    deformation of the article surface;
    the computer system being operative to generate a point cloud based on the positional data and reconstruct the point cloud to generate a digital model of the test article.

8. The monitoring system of claim 7 wherein:
    the computer system is operative to simultaneously regulate movement of the test article and display the digital model of the test article.

9. A monitoring system for monitoring a test article having at least one article surface and being positioned within a fluid tunnel and supported by a support mechanism, the monitoring system comprising:
    a scanning system configured to scan the test article and record positional data of at least one point on the article surface, the scanning system being configured to scan the support mechanism while scanning the test article; and
    a computer system in communication with the scanning system for receiving the positional data and being operative to determine at least one of the following:
    a position of the test article;
    an attitude of the test article;
    deformation of the article surface;
    deflection of the support mechanism.

10. A monitoring system for monitoring a test article having at least one article surface and being positioned within a fluid tunnel having at least one tunnel wall, the monitoring system comprising:
    a scanning system configured to scan the test article and record positional data of at least one point on the article surface, the scanning system being configured to scan the tunnel wall while scanning the test article; and
    a computer system in communication with the scanning system for receiving the positional data and being operative to determine at least one of the following:
    a position of the test article;
    an attitude of the test article;
    deformation of the article surface;
    displacement of the tunnel wall.

11. A monitoring system for generating an image of a test article having at least one article surface and being positioned within a fluid tunnel, the monitoring system comprising:
a scanning system configured to scan the test article and record positional data of at least one point on the article surface; and
a computer system in communication with the scanning system for receiving the positional data, forming a point cloud of the article surface, reconstructing the point cloud to generate a digital model of the test article, and displaying the digital model.

12. The monitoring system of claim 11 wherein:
the computer system is operative to regulate movement of the test article in response to the positional data.

13. The monitoring system of claim 12 wherein:
the computer system is operative to move the test article while scanning the test article and displaying the digital model.

14. A method of controlling a test article within a fluid tunnel, comprising the steps of:
scanning the test article using a scanning system mounted to the fluid tunnel to determine a current attitude of the test article;
determining a difference between the current attitude and a desired attitude of the test article; and
adjusting the attitude of the test article by an amount equal to the difference.

15. The method of claim 14 further comprising the step of:
passing a flow of fluid over the test article while scanning the test article.

16. The method of claim 14 wherein:
the steps of scanning the test article, determining the difference, and adjusting the attitude are continuously repeated as the test article is moved through a succession of desired attitudes.

17. The method of claim 14 wherein the step of adjusting the attitude of the test article by an amount equal to the difference comprises:
adjusting at least one of roll, pitch and yaw of the test article.

18. The method of claim 14 wherein:
the test article is configured as an aircraft defining a pitch angle relative to horizontal;
the current and desired attitude being respectively defined as the current and desired pitch angle of the aircraft.

19. A method of controlling a test article within a fluid tunnel, the test article being supported by a support mechanism, the method comprising the steps of:
scanning the test article to determine a current attitude of the test article;
determining a difference between the current attitude and a desired attitude of the test article;
adjusting the attitude of the test article by an amount equal to the difference.
scanning the support mechanism while scanning the test article;
determining a deflection of the support mechanism; and
compensating for the deflection of the support mechanism when adjusting the attitude of the test article.

20. A method of controlling a test article within a fluid tunnel comprising the steps of:
scanning the test article to determine a current attitude of the test article;
determining a difference between the current attitude and a desired attitude of the test article;
adjusting the attitude of the test article by an amount equal to the difference.
recording positional data of a plurality of points on an article surface of the test article when scanning the test article;
generating a point cloud based on the positional data; and
reconstructing the point cloud to generate a digital model of the test article.

21. The method of claim 20 further comprising the step of:
displaying the digital model of the test article when adjusting the attitude of the test article.

22. A method of real-time visualization of a test article within a fluid tunnel, the method comprising the steps of:
scanning the test article;
generating a point cloud;
reconstructing the point cloud to generate a digital model of the test article; and
displaying the digital model.

23. The method of claim 22 further comprising the step of:
moving the test article while scanning the test article.

24. The method of claim 22 further comprising the step of:
moving the test article from a current attitude to a desired attitude while scanning the test article.

25. The method of claim 24 wherein the steps of scanning the test article, generating the point cloud, reconstructing the point cloud, and displaying the digital model are continuously repeated as the test article is moved through a succession of desired attitudes.

* * * * *